(12) United States Patent
Mollis

(10) Patent No.: US 10,388,025 B2
(45) Date of Patent: Aug. 20, 2019

(54) INTERACTIVE IMAGE BASED 3D PANOGRAGH

(71) Applicant: ONSITEIQ, INC., New York, NY (US)

(72) Inventor: John Mollis, Colts Neck, NJ (US)

(73) Assignee: OnsiteIQ Inc., New York, NY (US)

( * ) Notice: Subject to any disclaimer, the term of this patent is extended or adjusted under 35 U.S.C. 154(b) by 0 days.

(21) Appl. No.: 15/605,018

(22) Filed: May 25, 2017

(65) Prior Publication Data
US 2018/0342100 A1 Nov. 29, 2018

(51) Int. Cl.
G06T 19/00 (2011.01)
G06T 7/33 (2017.01)
G06T 15/20 (2011.01)

(52) U.S. Cl.
CPC .......... *G06T 7/337* (2017.01); *G06T 15/205* (2013.01); *G06T 2207/10028* (2013.01)

(58) Field of Classification Search
CPC ....... G06T 19/003; G06T 7/337; G06T 15/40; G06T 17/20; G06T 2207/10028; G06T 19/20; G06T 17/205; G06T 15/005; G06T 19/00; G06T 2210/44; G06T 17/00; G06T 2200/08
See application file for complete search history.

(56) References Cited

U.S. PATENT DOCUMENTS

| | | | | |
|---|---|---|---|---|
| 6,268,846 B1* | 7/2001 | Georgiev | .............. | G06T 3/0093 345/419 |
| 2007/0110338 A1* | 5/2007 | Snavely | ............ | G06F 17/30274 382/305 |
| 2015/0024337 A1* | 1/2015 | Blassnig | ................. | G06T 15/06 433/29 |

* cited by examiner

*Primary Examiner* — Xilin Guo
(74) *Attorney, Agent, or Firm* — M&B IP Analysts, LLC

(57) ABSTRACT

Methods and systems for generating a 3D panograph of a 3D space are provided. The method includes receiving connectivity information between at least a first image and a second image of a plurality of images, determining correspondences between the first image and the second image using the connectivity information, determining a first morph mesh for the first image and a second morph mesh for the second image using the correspondences, and generating the 3D panograph. The 3D panograph includes the first morph mesh, the second morph mesh, and the connectivity information. The 3D panograph is navigable. A method for navigating the 3D panograph is also provided. The method includes, in response to receiving a navigation request from the first image to the second image, displaying, on a display device, successive interpolations from the first image to the second image using a morph mesh.

16 Claims, 13 Drawing Sheets

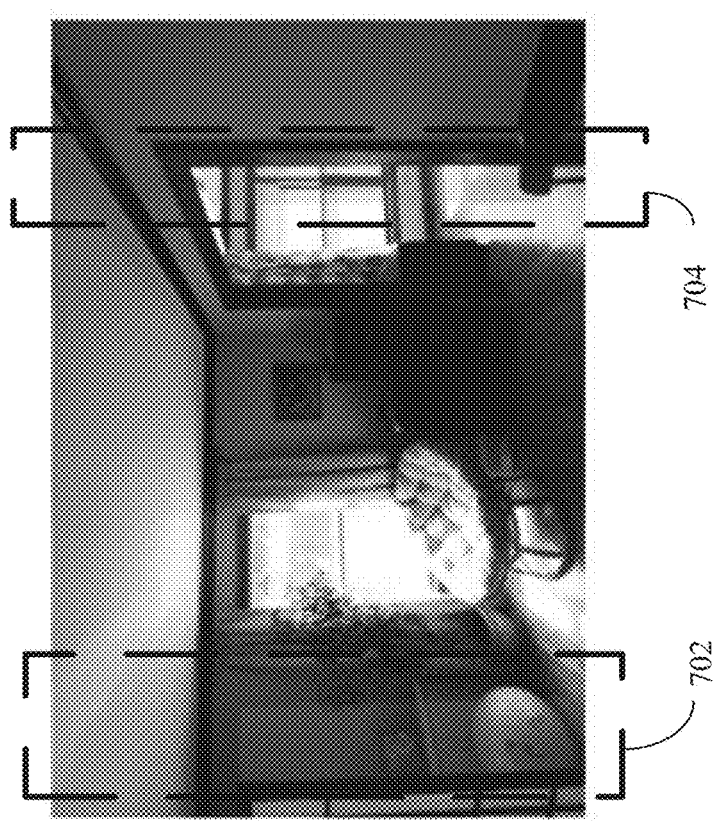
FIG. 7A
FIG. 7B

INTERACTIVE IMAGE BASED 3D PANOGRAGH

TECHNICAL FIELD

This disclosure generally relates to interactive virtual navigation, and more specifically, to interactive image-based 3D panograph.

BACKGROUND

Virtual navigation of a three-dimensional environment (i.e., a 3D space) can involve the creation of multiple three-dimensional models between different locations of the 3D space. Navigating from one location to another can involve the use of the 3D models.

SUMMARY

Disclosed herein are aspects, features, elements, and implementations of interactive image-based 3D panograph.

In a first aspect, a method for generating a 3D panograph of a 3D space is provided. The method includes receiving connectivity information between at least a first image and a second image of a plurality of images, determining correspondences between the first image and the second image using the connectivity information, determining a first morph mesh for the first image and a second morph mesh for the second image using the correspondences, and generating the 3D panograph. The 3D panograph includes the first morph mesh, the second morph mesh, and the connectivity information. The 3D panograph is navigable using the first morph mesh, the second morph mesh, and the connectivity information.

In a second aspect, a system for generating a 3D panograph of a 3D space is provided including a processor and a memory coupled to the processor. The memory includes instructions executable by the processor to receive connectivity information between at least a first image and a second image of a plurality of images, determine correspondences between the first image and the second image using the connectivity information, determine a morph mesh for the first image and the second image using the correspondences, and generate the 3D panograph. The 3D panograph includes the morph mesh and the connectivity information.

In a third aspect, a method for navigating a 3D panograph of a 3D space is provided. The 3D panograph includes a morph mesh corresponding to a first image and a second image of the 3D space. The method includes, in response to receiving a navigation request from the first image to the second image, displaying, on a display device, successive interpolations from the first image to the second image using the morph mesh.

These and other aspects of this disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 7A-7B illustrate areas without correspondences of a scene according to implementations of this disclosure.

DETAILED DESCRIPTION

Figure 1:
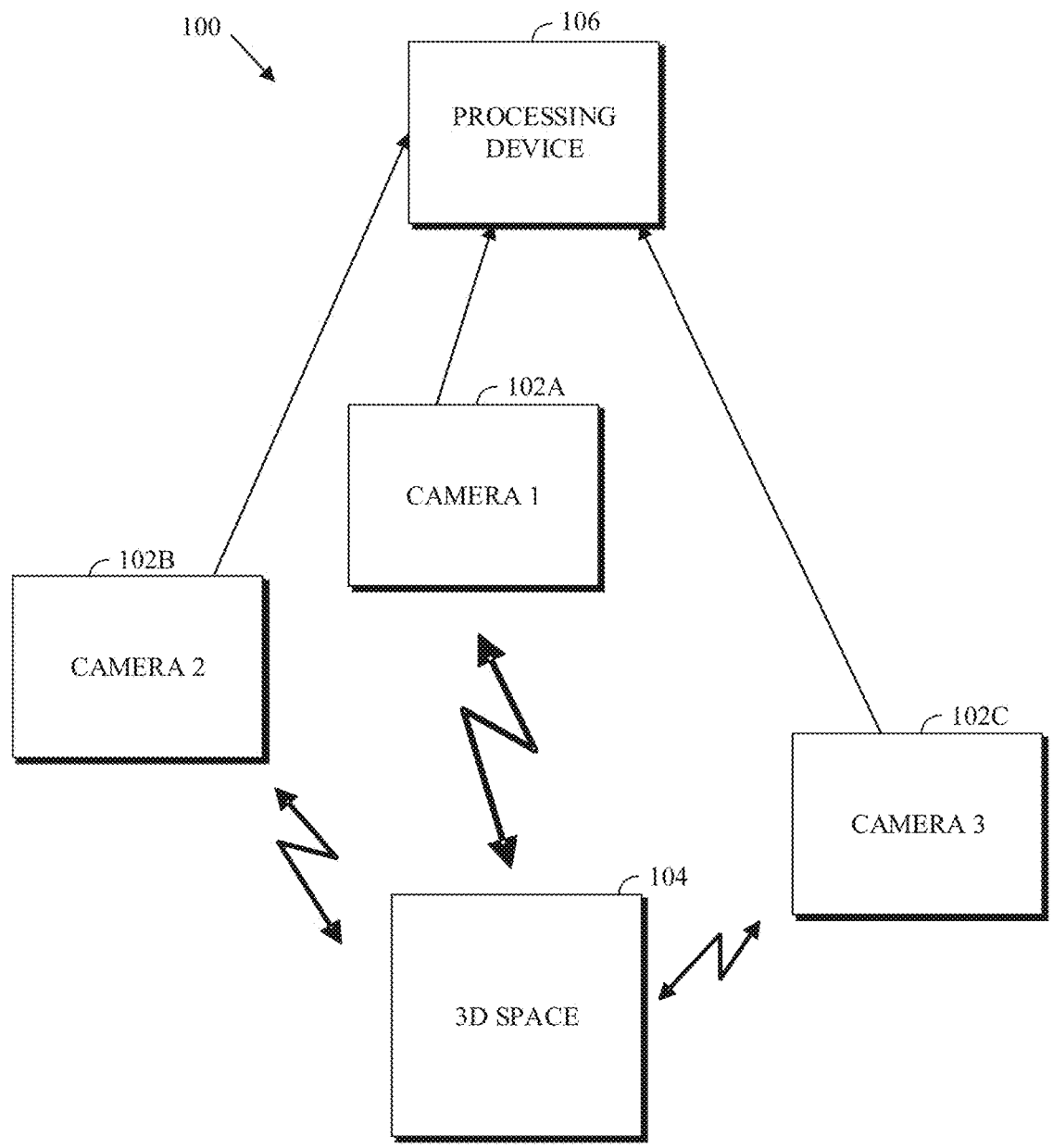
FIG. 1 is a schematic of a system for interactive image-based 3D panograph according to implementations of this disclosure.

Virtual navigation of a 3D space can involve the creation of multiple three-dimensional models between different locations of the 3D space. The 3D models can be used for interpolation between virtual locations corresponding to actual locations of the 3D space. For example, 3D models of the real world (i.e., the 3D space) can be derived using techniques such as photogrammetry, RGB-D volumetric integration or laser scanning. These techniques can lead to the creation of 3D textured, triangulated mesh models of the 3D space. These models offer a generally poor experience when compared to a real world experience and in particular in comparison to standard digital imagery and video. As such, and due to limitations in quality and realism of 3D models, an image-based (e.g., 2D images, spherical images, etc.) approach of the present disclosure, backed by 3D models, can provide improvements over approaches that rely solely on 3D models. "Image" and "imagery" are used herein interchangeably.

A method and system in accordance with the present disclosure uses an imagery approach backed by 3D models. For example, 360×180 images can be taken at multiple locations of the 3D space. These 360×180 images can provide viewpoints at which a user can, virtually, stop and, in the case of spherical images, explore the surroundings. Using a computing device (e.g., smartphone, laptop, etc.), a user can virtually navigate from one viewpoint to another by making a section (e.g., clicking a mouse button) to move from one viewpoint to another. In such a system, the user experience is such that the view jumps from one viewpoint to another. In between the viewpoint, rough 3D models (e.g., captured using specialized equipment such as laser scanners or other means) are used to create a view interpolation. The view interpolation (also referred to herein as "interpolation") is a rough approximation of the data between the two viewpoints, is typically a poor low fidelity experience, and does not provide a video-like experience. That is, the jump from one viewpoint to another is a not smooth. Rather, the jump may be a discreet jump such that the user may not be able to discern any objects or scenery between the viewpoints.

Additionally, creating such experiences can require expensive systems and cameras (e.g., laser scanners). The expense can prohibit the average camera user (e.g., a user using the camera of a smartphone or a spherical camera) from creating or contributing to the creation of 3D virtual experiences. As such, an unmet need in the area of navigable 3D experiences is a need to allow anyone with a camera to be able to create navigable 3D experiences without the use of specialized equipment, such as special scanning and imaging hardware.

As such, a system that can, in the creation a 3D image-based virtual experience, use 3D information in such a way that interpolation between imagery viewpoints is compelling (i.e., realistic) provides an improvement over existing techniques and systems. Such a system can provide an experience that can be nearly seamless in that interpolation between viewpoints (i.e., from one view to the next) can be smooth. A smooth experience can be one where, for example, a user is moved from one viewpoint to the next without experiencing a jump between viewpoints. A smooth experience can be close in appearance to a video taken over the same viewpoint path (i.e., from a starting viewpoint to an ending viewpoint) through the 3D space.

Additionally, a system that can leverage imagery (e.g., 2D or spherical images) provides an improvement over systems and techniques that require the use of specialized equipment. Such a system can be accessible to, and usable by, a person having a non-specialized camera.

Systems, processes, and methods according to implementations of this disclosure can generate a 3D panograph that enables an experience that is between a video and a 3D model by: synthesizing a realistic image interpolation that can approximate of a real image between two actual imagery locations (i.e., viewpoints); enabling a real-time (i.e., navigation and/or playback) view) image synthesis regardless of scene complexity; minimizing pre-computed interpolation information storage and network bandwidth requirements; and enabling novel view rendering on client computers with real-time graphics systems.

The 3D panograph comprises a graph that describes connectivity between imagery from camera locations (i.e., viewpoints) and one or more morph meshes which can be interpolated between locations (i.e., viewpoints) along a path of navigation. A morph mesh is a collection of points (i.e., vertices) and faces. As described below, the points can represent correspondences between features of two or more images. The faces can be triangles that connect vertices. The faces of a morph mesh can be determined via triangulation. The morph meshes of a first image and a second image can be used for image-based view interpolation. That is, a morph mesh can take one set of 2D or 3D points and maps them to another set of positions (i.e., in a second morph mesh) over some time period. The 3D panograph can include the imagery. Alternatively, the 3D panograph can refer to the imagery. The imagery used to generate the 3D panograph can be referred to herein as the images (or imagery) of the 3D panograph. The morph mesh of a 3D panograph can include one or more morph meshes. For example, one morph mesh can be included for each image of the 3D panograph, one morph mesh can be used for interpolations between two or more images, one morph mesh can be used for each pair of connected images (as described below), or any combination thereof. A second morph mesh can be a description (i.e., a model) of a how the vertices of first morph mesh transform to the second morph mesh.

The 3D panograph can be efficiently streamed over the internet. The bandwidth requirements for a 3D panograph can be lower than that of a video with the same or similar resolution as the images of the 3D panograph. It has been observed that the sizes of the morph meshes do not change appreciably as a function of image complexity. Complexity may be determined by the number of features of the imagery. The size (i.e., file size, disk space size, or the like) of the 3D panograph can be more affected by the resolution of input images than by any other information (e.g., the morph meshes) used by the 3D panograph. Real-time graphics systems (e.g., OpenGL, WebGL, and the like) can be used to display the morph meshes of a 3D panograph as a seamless, interactive and navigable 3D experience in which the user traverses smoothly from one viewpoint to the next and the visual appearance of the scene is approximated by the starting imagery, ending imagery and an intervening morph mesh.

A 3D panograph generated according to implementations of this disclosure can be used to enable interactive three-dimensional (3D) virtual reality (VR) (including mixed and augmented reality experiences) based on real or simulated environments. Uses of a 3D panograph include tours of businesses, real-estate, travel/tourist locations, heritage sites, venues, and institutions; interactive educational experiences; interactive journalism experiences; tours of unbuilt 3D modelled space; a framework upon which other 3D/VR experiences can be built; and a medium of artistic expression for photographers and enthusiasts. Other uses are also possible.

As further described below, a 3D panograph can be generated without the need for 3D information (e.g., without 3D triangulation) about a 3D space; can be generated using a morph mesh instead of, for example, per-pixel interpolation or morphing; can provide a good quality interpolation during playback by using well-vetted sparse features; and can be tolerant to large displacements in camera motion. During playback, a user can, for example, instantly stop, back up, turn around, move at varied speeds, or take various paths.

FIG. 1 is a schematic 100 of a system for interactive image-based 3D panograph according to implementations of this disclosure. Mosaics means images or imagery. The schematic 100 includes a 3D space 104, one or more cameras 102, and a processing device.

The 3D space can be any 3D space for which a navigable 3D panograph is to be generated. For example, the 3D space can be a home, a shopping mall, an airport, a backyard, a street, a field, and so on. Images are taken of the 3D space using cameras 102. The cameras 102 can be the same camera. For example, using a cellular phone or a spherical camera, a user can walk through (or fly over, etc.) the 3D space capturing images at different locations and of different features of the 3D space. For example, at a first location (corresponding to camera 1 102A), a first image is captured. The user can walk three steps forward to another location of the 3D space and capture a second image (corresponding to camera 2 102B). The user can then walk five steps to the left and take another image (corresponding to camera 2 102C). Taking images of the 3D space results in a set of images of the 3D space. The set of images of the 3D space can be taken by one user or can be taken by multiple users. "User," as used herein, can be any person, system, robot, device, or the like capable of taking pictures of the 3D space.

The camera 102 can be any type of camera. For example, the camera 102 can be a portable camera, the camera of a cellular phone, the camera of a laptop, an internet camera, a drone capable of capturing images, or the like. The camera can be any camera capable of taking or generating a 2D, spherical images, or cube map images, or the like.

The set of images can be provided to the processing device 106. The set of images can be provided to the processing device 106 via any means. For example, some of the images can be transmitted to the processing device 106 via a wireless interface, such as WiFi, Bluetooth (BT), cellular data link, ZigBee, or near field communications (NFC) link (e.g., using ISO/IEC 14443 protocol, ANT+ link), and/or other wireless communication links. Some of the images can transmitted via a wired interface, such as HDMI, USB, digital video interface, display port interface (e.g., digital display interface developed by the Video Electronics Standards Association (VESA), Ethernet, Thunderbolt), and/or other interface. Other means of providing images to the processing device 106 are available.

Using at least some of the provided images, the processing device 106 can generate a 3D panograph that is interactive, navigable, and image-based. The processing device 106, in one example, can be a computer having an internal configuration of hardware such as that described in FIG. 2. However, other suitable implementations of the processing device 106 are possible. For example, the processing of the processing device 106 can be distributed among multiple devices.

Figure 2:
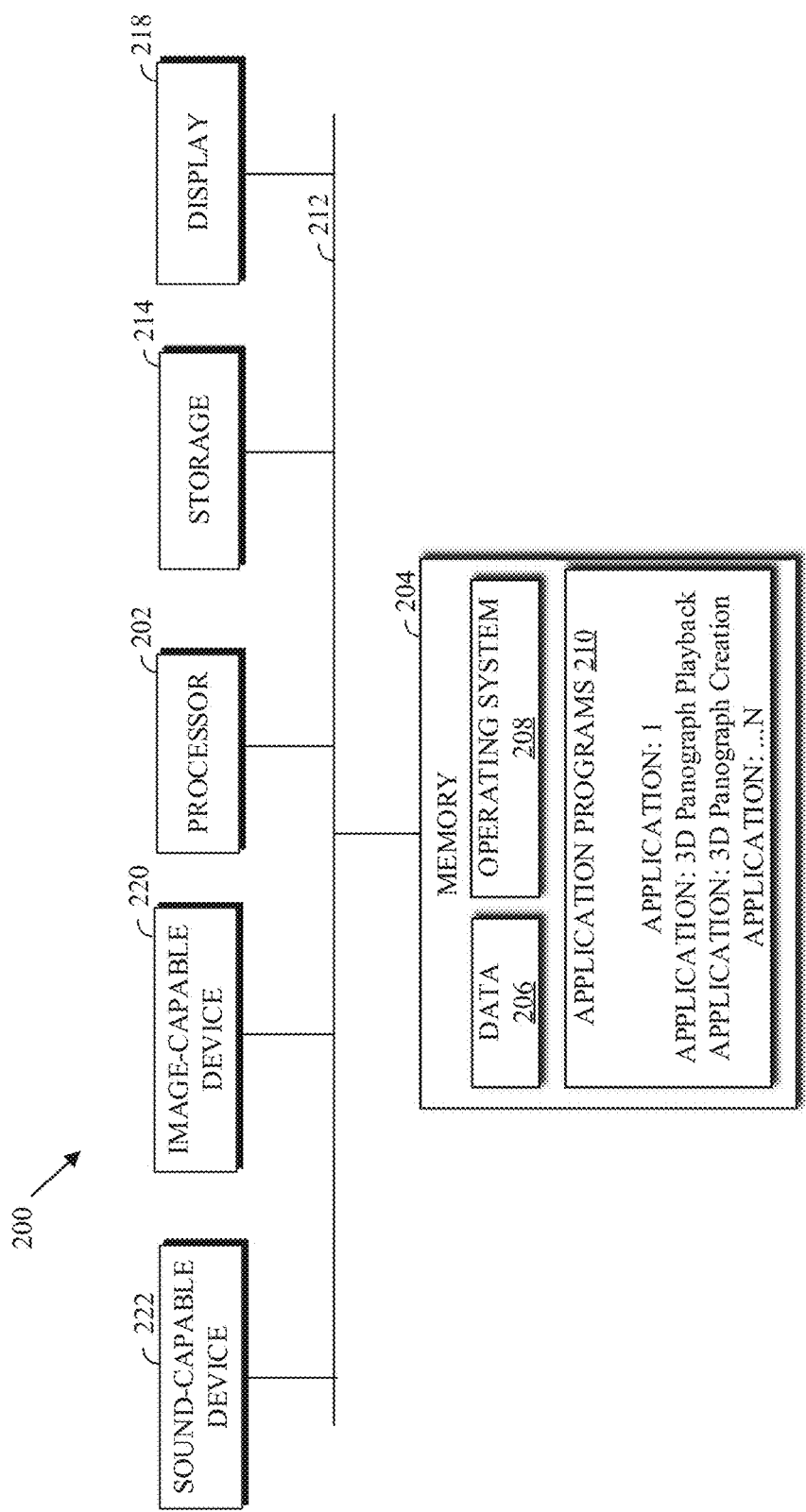
FIG. 2 is a block diagram of an example of a computing device that can be used for interactive image-based 3D panograph according to implementations of this disclosure.

FIG. 2 is a block diagram of an example of a computing device 200 that can be used for interactive image-based 3D panograph according to implementations of this disclosure. The computing device 200 can be in the form of a computing system including multiple computing devices, or in the form of a single computing device, for example, a mobile phone, a tablet computer, a laptop computer, a notebook computer, a desktop computer, and the like. The computing device 200 includes a CPU 202, a memory 204, a secondary storage 214, a display 218, an image-capable device 220, and a sound-capable device.

The CPU 202 can be a central processing unit or any other type of device, or multiple devices, capable of manipulating or processing information. The CPU 202 can be multiple processors. The CPU 202 can include at least one graphics processing unit (GPU) (not shown). Alternatively, one or more graphics processing units can be separate from the CPU 202.

The memory 204 can be a read-only memory (ROM) device, a random access memory (RAM) device, or a combination thereof. Any other suitable type of storage device can be used as the memory 204. The memory 204 can include code and data 206 that is accessed by the CPU 202 using a bus 212. The memory 204 can further include an operating system 208 and application programs 210. The application programs 210 can include instructions that permit the CPU 202 to perform the methods described here. For example, the application programs 210 can include applications to create 3D panograph that is interactive, navigable, and image-based. For example, the application programs 210 can include applications to navigate (i.e., playback) the 3D panograph. The computing device 200 can also include a secondary storage 214, which can, for example, be a memory card used with a computing device 200 that is mobile.

The display 218 may be a touch sensitive display that combines a display with a touch sensitive element that is operable to sense touch inputs. The display 218 can be a liquid crystal display (LCD), a cathode-ray tube (CRT) display or light emitting diode (LED) display, such as an organic LED (OLED) display, or other type of display. The computing device 200 may include other output devices.

The computing device 200 can also include or be in communication with an image-capable device 220. The image-capable device can be a camera, such as the camera 102 of FIG. 1. The computing device 200 can also include or be in communication with a sound-capable device 222, for example a microphone, or any other sound-sensing device now existing or hereafter developed that can sense sounds near the computing device 200.

In some implementations, the computing device 200 can be implemented using general purpose computers/processors with a computer program that, when executed, carries out any of the respective methods, algorithms and/or instructions described herein. In addition, or alternatively, for example, special purpose computers/processors can be utilized which can contain specialized hardware for carrying out any of the methods, algorithms, or instructions described herein.

Figure 3:
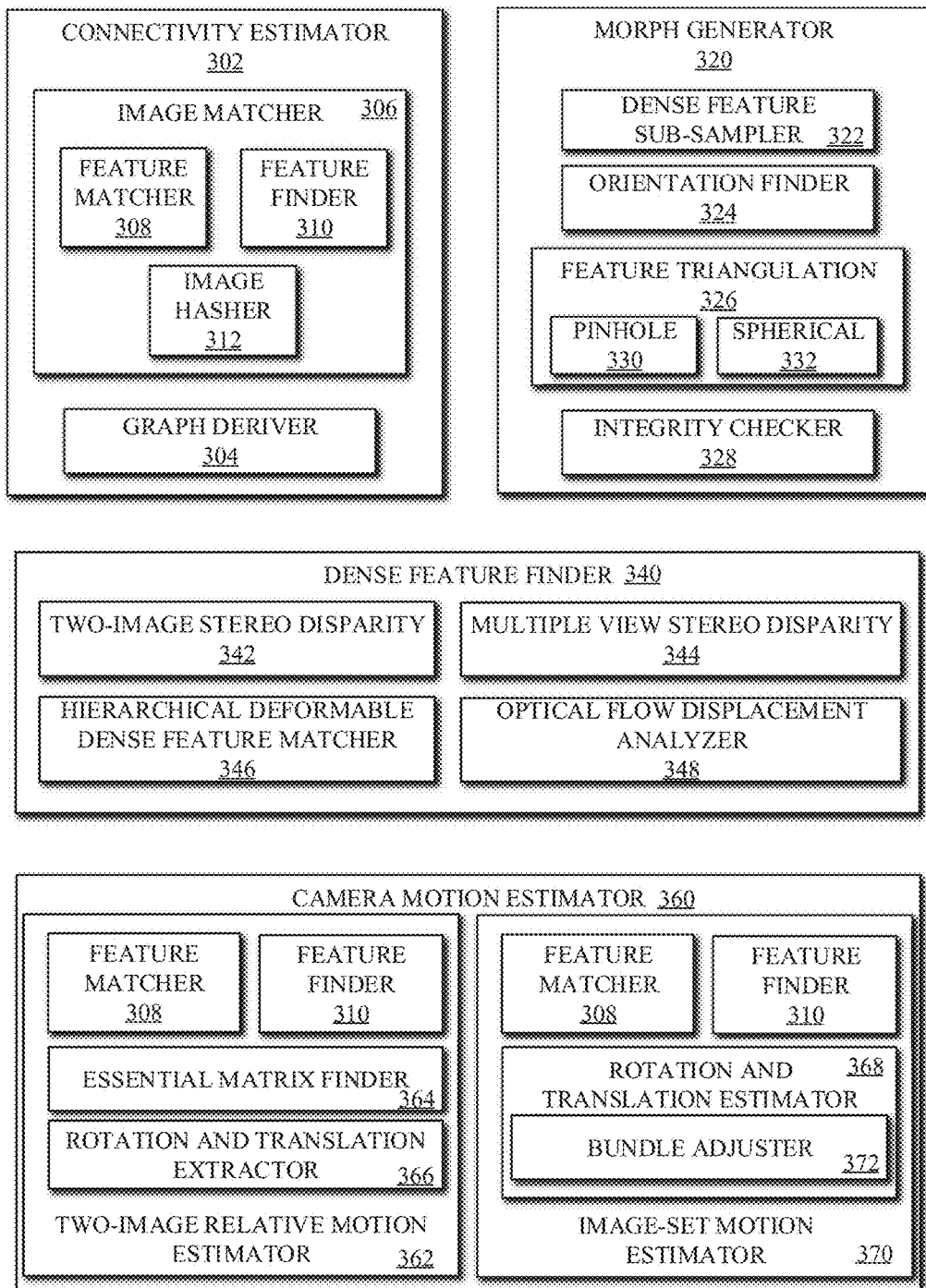
FIG. 3 is a block diagram of an example of a system used for generating a 3D panograph according to implementations of this disclosure.

FIG. 3 is a block diagram of an example of system 300 used for generating a 3D panograph according to implementations of this disclosure. The system 300 can include a connectivity estimator module 302, a morph generator module 320, a dense feature finder module 340, and a camera motion estimator module 360. The system 300 can be or can be implemented by one or more computing devices, such as the computing device 200 of FIG. 2.

The system 300 can receive images of a 3D space. The received images can be digital images or digitized images (such as by scanning or taking a digital image of a hardcopy photograph). The received images can include traditional images (i.e., photographs), full or partial equirectangular images, cube map images, or the like, or any combination thereof. The received images can include stereo images. In the case of stereo images, each image of the stereo pair can be processed separately (i.e., each image of the pair can be treated as separate image).

The stereo images can be images captured with two or more 360-degree cameras, each corresponding to a capture location. The two or more 360-degree cameras can be separated by a distance and/or having certain configurations. As such, the stereo images can be used as a group. Each capture location can have multiple associated images. The associated images can be used to provide a 3D panograph that, in addition to or alternatively to navigation paths of the 3D space, can enable volumes in the 3D space. Using a three-dimensional grid of sample locations in space, interpolating between grid imagery sample points can simulate a three-dimensional six degrees of freedom movement in the 3D space.

Some of the received images can have different resolutions, rotations, formats, and the like. Spherical images may be preferred since they provide an entire 360×180 degree view at the respective spot in space and, as such, provide a richer and more immersive user experience during playback.

The received images of the 3D space can be spaced at any distance. For example, the distance can range from less than one inch to miles. For example, the images can be taken approximately two to six feet apart. For example, a second image can be taken two feet away (in a forward direction) from a first image; and a third image can be taken three feet away (in leftward direction) from the second image. Closer images can result in higher interpolation quality. For example, images that are spaced two feet apart can yield better result than images that are taken 10 feet apart. However, the distance of the features in the 3D space can impact the quality of the interpolation and how far apart images are to be taken. For example, when the 3D space is the interior of a house (i.e., where features may be cramped and/or close together), the spacing of the images may need to be smaller than a 3D space that is imaged from a further away distance (e.g., imaging a field from an air plane or a drone). Implementations according to this disclosure can be tolerant to larger feature displacements from one image to a succeeding or preceding image as later described.

As further described below, using the received images, the system 300 can receive (e.g., receive from a user or compute) connectivity information, optionally compute the relative or absolute rotation and translation of the cameras, derive sparse and/or dense 2D correspondences between adjacent images, convert (for an image) the correspondences into a triangulated mesh that encodes the image plane motion of corresponding points from one viewpoint to the next along the path (a morph mesh), and ensure that the morph mesh is consistent (e.g., that the morph mesh does not cross itself). A correspondence can be defined as a point in a first image that is identified as the same point in a second image, where the first image and the second image are images of the same 3D space, taken from different points of view.

Figure 4:
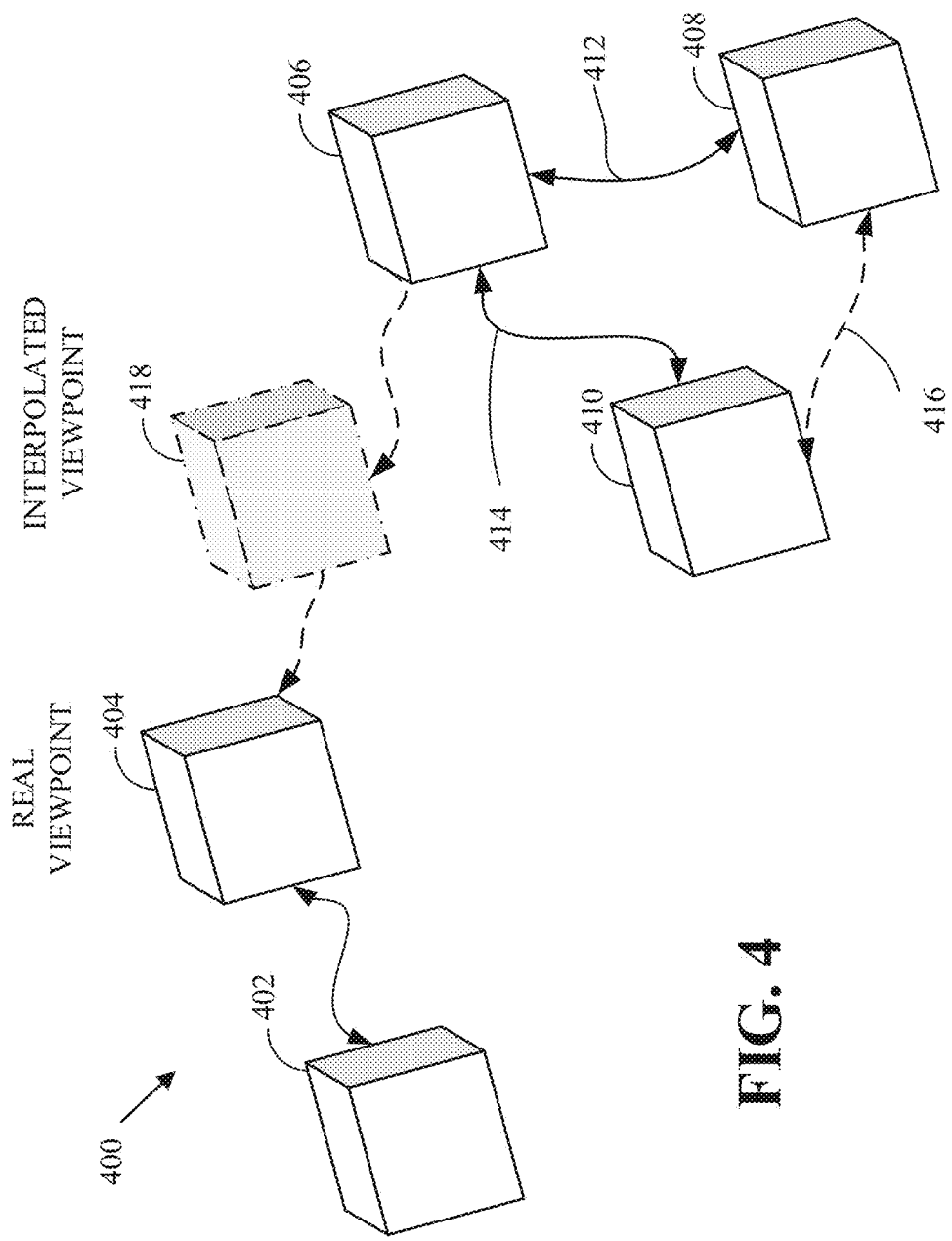
FIG. 4 is a diagram of an example of traversable paths through a 3D space according to implementations of this disclosure.

In one implementation, the connectivity estimator module 302 receives, such as from a user, connectivity information between at least some of the received images. The connectivity information can constitute traversable paths through a 3D space. FIG. 4 is a diagram of an example of traversable paths 400 through a 3D space according to implementations of this disclosure. FIG. 4 depicts images 402-410, which are real viewpoint. The images 402-410 can be the set of images (or a subset thereof) received by the system 300. "Real viewpoint" means a viewpoint that corresponds to an image that is provided as input to the system 300. FIG. 4. includes an interpolated view 418. As described below, the interpolated view 418 can be generated during playback of a 3D panograph. The interpolated view 418 is an interpolation of the images 404 and 406 using the morph meshes corresponding to the images 404 and 406, respectively.

The system 300 also receives input indicating the connectivity information between images (illustrated by the solid arrows in FIG. 4). The connectivity information can indicate the navigation paths that are to be enabled via a 3D panograph generated by the system 300. For example, the connectively information can be received from a user. The user can indicate that a navigation from the image 406 is possible, along a path 414, to the image 410 and, along the path 412, to the image 408. Each of the images of the 3D panograph constitutes a viewpoint. In an implementation, the connectivity information can be provided via image pairs. For example, where an image number (e.g., 402, 404, etc.) uniquely identifies a particular image, the image pair (402, 404) can indicate a connection (i.e., a path) from the image 402 to the image 404. Alternatively, an image pair can indicate a 2-way connection between the images of the image pair. That is, for the image (406, 410), a navigation (i.e., a path) is possible from the image 406 to the image 410 and a navigation is possible from the image 410 to the image 406. Other ways of indicating connectivity information are available.

The connectivity information provided by the user need not be physically possible. For example, image 402 may be an image of a basement of a house while image 404 is an image of a second floor bedroom of the same house. While no line-of-sight navigation is physically possible, the system 300 can provide a navigation between the viewpoints corresponding to the images 402 and 404 as described herein.

In an example, the user can indicate connectivity information between every two images. That is, in the case where n images are provided to the system 300, a total of O(n²) connections are also provided. Limiting the paths can reduce the complexity and data requirements of the generated 3D panograph. More paths can be used, without adversely affecting complexity and the data requirements, in the case of sparsely sampled scenes (i.e., spare features, as described below).

In another implementation, the connectivity estimator module 302 can determine additional connectivity information in addition to, or instead of, receiving the connectivity information from a user. For example, the connectivity estimator can determine additional connectivity information not provided by the user. For example, the connectivity estimator module 302 can determine the additional connectivity information corresponding to a path 416 (in FIG. 4) between the image 410 and the image 408. In an implementation, the connectivity estimator module 302 can present, to the user, the additional connectivity information. The user can select some or all of the additional connectivity information to include in the 3D panograph. The connectivity estimator module 302 can determine additional connectivity information using feature matching techniques.

In an implementation where the connectivity estimator module 302 can determine additional connectivity information, the connectivity estimator module 302 can include, or use, an image matcher module 306, which can include a feature matcher 308 and a feature finder 310, and a graph deriver 304. The feature matcher 308 and the feature finder 310 are further described with respect to the camera motion estimator module 360. The image hasher 312 can be used to identify similarities between images or regions of images. For example, the image hasher 312 can identify similarities between images (or regions of images) that are differently rotated or scaled or include different levels of noise and the like. The graph deriver 304 determines a connected graph between images, as illustrated in FIG. 4. In an example, the connectivity estimator module 302 can determine that a first image is connected to a second based on the number of matched features of the images. If the number of matched features exceeds a threshold, then the first image and the second image are determined to be connected.

The camera motion estimator module 360 determines camera motion. Camera motion can be used for culling bad correspondences (i.e., determined correspondences that aren't valid correspondences) and can be a starting point for image rectification and computation of dense correspondences (e.g., disparity maps). Camera motion can also be used for effective (e.g., smooth) pacing of the 3D panograph while navigating during playback and for placement of 3D markup in a scene of the 3D panograph. The camera motion can be a relative camera motion, a neighborhood camera motion, and/or a global camera motion.

Camera motion includes the camera positions and orientations of two or more cameras. The camera motion estimator module 360 can include a two-image relative motion estimator module 362 and an image-set motion estimator 370. Correspondences determined by the feature matcher 308 (e.g., as part of the connectivity estimator module 302 or the camera motion estimator module) are referred to herein as sparse correspondences.

Relative camera motion is a camera motion determined between a pair of cameras of connected images. Determining relative camera motion can provide rotation and translation information between two cameras. Relative camera motion may not provide absolute knowledge of distances between, or relation in 3D space, of the pair of cameras. A relative camera motion can, for example, be determined between the camera of image 406 and the camera of image 408 along the path 412 and a relative camera motion can be determined between the camera of image 408 and the camera of image 410 along the path 416. Determining relative camera motion can provide the Essential and/or Fundamental matrices that describe the geometric epipolar constraints between two cameras using generated correspondences.

The relative camera motion can be determined by the two-image relative motion estimator module 362, which can include the feature matcher 308, the feature finder 310, the Essential matrix finder 364, and the rotation and translation extractor 366. Any known techniques can be used by the feature matcher 308, the feature finder 310, the Essential matrix finder 364, and the rotation and translation extractor 366. Using relative camera motion (and/or no camera motion at all) can add flexibility, robustness and increased processing speed in the generation of a 3D panograph over techniques that use global camera motion.

Figure 5A:
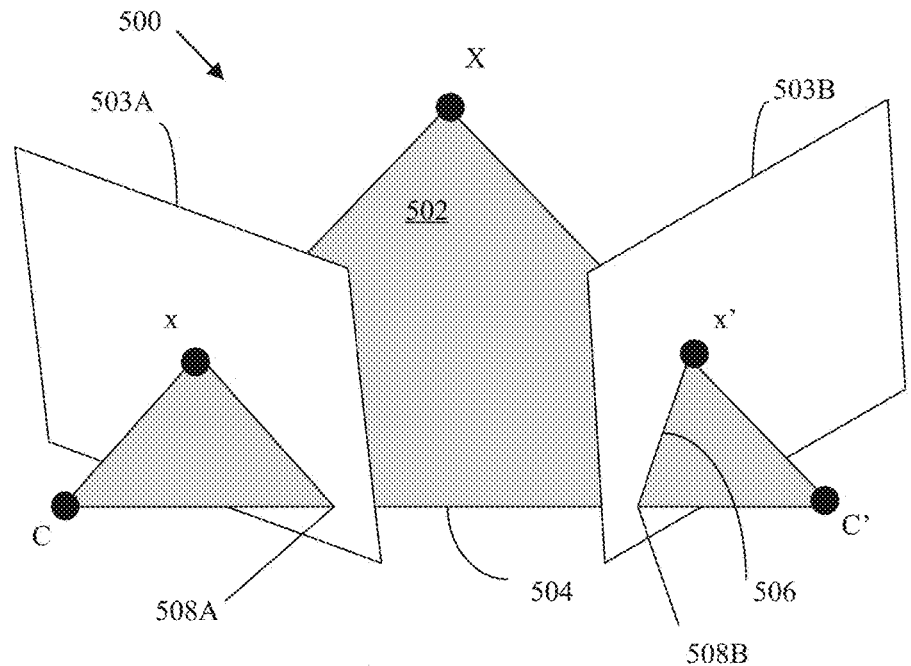
FIG. 5A is an illustration of epipolar geometry for a pinhole camera according to implementations of this disclosure.

In the case of a pinhole camera (i.e., a camera capable of capturing 2D images), a point in a first image lies along an epipolar line in a second image. FIG. 5A illustrates the epipolar geometry 500 between two pinhole cameras centered at C and C' with image plane correspondences x and x' and world location X. Given an image point (e.g., point x) in one image, corresponding to a point X in the 3D space, the corresponding point (i.e., point x') in another image can be determined using the epipolar geometry. In FIG. 5A, the line connecting the camera centers C and C' is known as the baseline (i.e., baseline 504); plane 502 is known as the epipolar plane, which is the plane defined by the points C, C', and X; line 506 is known as the epipolar line; planes 503 are known as image planes. For the world location X that is known to project to point x in the image plane of the first camera centered at C, the epipolar line is the line along which X projects onto the image plane of the camera centered at C'. The epipolar line is the line of intersection between the epipolar plane and the image plane of the camera centered at C'. Points 508 are known as the epipole. An epipole (e.g., epipole point 508A) is the point of intersection of the baseline (i.e., the baseline 504) with an image plane (e.g., plane 503A).

Figure 5B:
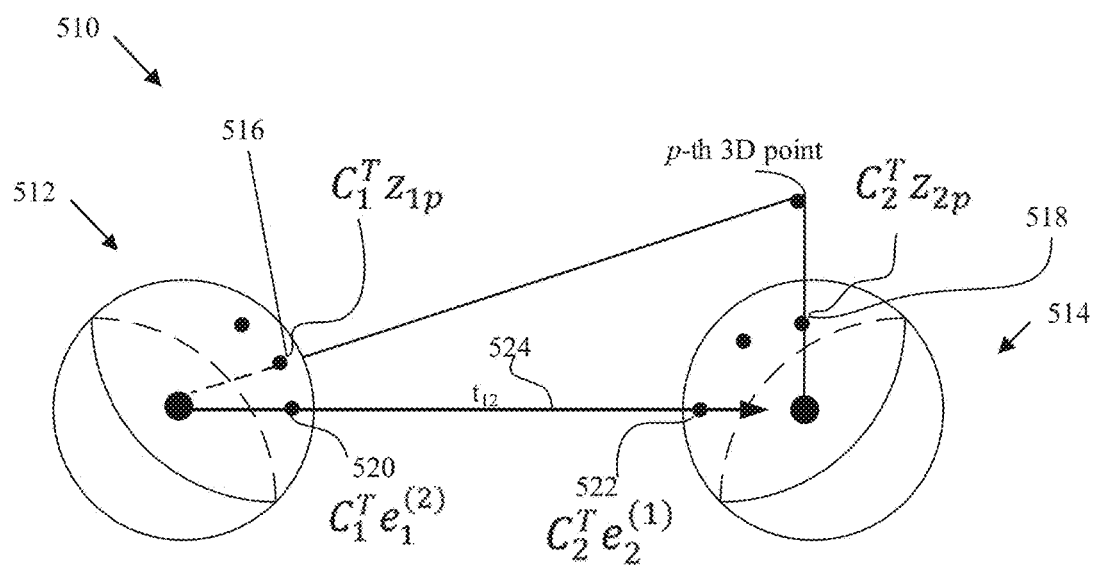
FIG. 5B is an illustration of epipolar geometry for a spherical camera according to implementations of this disclosure.

In the case of a spherical camera, the point in the second image lies along an epipolar great circle. FIG. 5B illustrates the epipolar geometry 510 for a spherical camera. In FIG. 5B, the point 516 $z_{1_p}$ and the point 518 $z_{2_p}$ are the p-th corresponding points in a first image 512 (e.g., the image 402 of FIG. 4) and a second image 514 (e.g., the image 404 of FIG. 4). The matrices $C_1$ and $C_2$ are the rotation from camera coordinates in each image to world coordinates (i.e., the coordinates of the 3D space). The epipolar constraint can be expressed as $$z_{1_p}^T E_{12} z_{2_p} = 0 \quad (1)$$

where $$E_{12} = C_1 [t_{12}]_x C_2^T \quad (2)$$

Equation (1) is the epipolar equation and $E_{12}$ is the Essential matrix. $[t_{12}]_x$ is the exterior product of $t_{12}$ and x. Again, epipolar great circles are used for spherical cameras whereas epipolar lines are used for pinhole 2D cameras.

In the case of a 2D image, the feature finder 310 can use any technique for generating features. For example, at least one of the well-known Scale Invariant Feature Transform (SIFT) or Speeded Up Robust Features (SURF) techniques can be used to detect features of an image. For example, the feature finder 310 can find features in at least some of the images received by the system 300. As described in Matthew Brown and David G. Lowe, "Automatic panoramic image stitching using invariant features," International Journal of Computer Vision, 74, 1 (2007), pp. 59-71, image features "can be used to perform reliable matching between different views of an object or scene. The features are invariant to image scale and rotation, and are shown to provide robust matching across a substantial range of affine distortion, change in 3D viewpoint, addition of noise, and change in illumination. The features are highly distinctive, in the sense that a single feature can be correctly matched with high probability against a large database of features from many images."

Figure 6A:
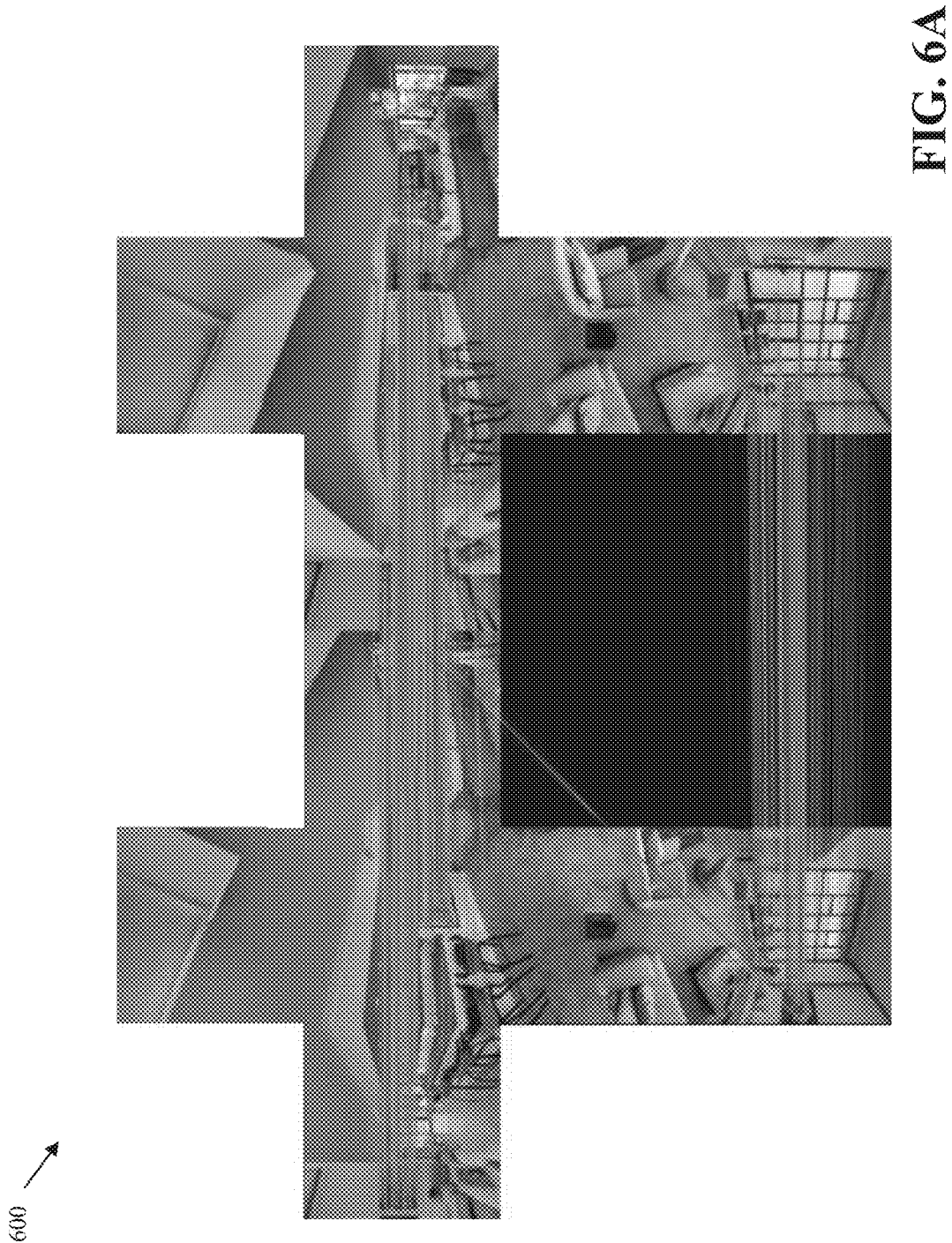
FIG. 6A is an illustration of mapping a spherical image onto a cube according to implementations of this disclosure.

Once the feature finder 310 finds features in images, the feature matcher 308 can match features between images. The matched image features are also referred to as correspondences. The feature finder 310 can find matching features between connected images. For example, the feature finder 310 can find matching features between the image 402 and the image 404 since a path is to be available between the images 402 and 404 in the generated 3D panograph. However, the feature matcher 308 may not attempt to find matches between the features of image 402 and the features of image 406 as no direct path (i.e., connectivity information) exists between the images 406 and 406. To match features in spherical images, the feature finder can first project a spherical image onto a cube map which can then be unfolded and matched. FIG. 6A is an illustration 600 of mapping a spherical image onto a cube according to implementations of this disclosure. In some implementations, if the number of matched features exceeds a first value, the system 300 can generate synthetic or intermediate viewpoints. The intermediate viewpoints can be created using the interpolations techniques described below. In some implementations, if the number of matched features is below a second value, the system 300 can determine that an interpolation cannot be reliably generated. When an interpolation cannot be reliably generated, the system 300 can identify the corresponding image pair for review. The system 300 can also include in the 3D panograph a visual effect (e.g., a fade) in place of the interpolation.

The Essential matrix finder 364 can determine the Essential and/or Fundamental matrix. Any technique can be used by the Essential matrix finder 364. For example, the Essential matrix finder 364 can use the eight-point algorithm available in the Open Source Computer Vision Library (OpenCV), which uses linear least squares. The eight-point algorithm can be applied to pinhole camera images (i.e., 2D images) and can be adapted to apply to spherical camera images.

The eight-point algorithm can be used in conjunction with the Random Sample Consensus (RANSAC) method to cull out outlier correspondences. Outlier correspondences include correspondences that do not fall on epipolar lines or epipolar great circles (in the case of spherical images). RANSAC is an iterative algorithm that can be used to estimate model parameters from data (i.e., correspondences) that contain inliers and outliers. Inliers are the data points (i.e., correspondences) that are retained. The inlier correspondences are referred to as the RANSAC consensus set. The outlier correspondences can be ignored (i.e., culled). RANSAC can be applied using a measure of geometric error in relation to the epipolar lines or the great circles for spherical cameras to give robust estimations of the Fundamental matrix in the presence of noise (such as incorrect or inaccurate correspondences). From a decomposition of the Essential matrix, a rotation and translation can be derived as described in Harley, "Multiple view geometry in computer vision," Cambridge University, Cambridge, $2^{nd}$ edition, 2003, pp. 257-260.

The Essential matrix finder 364 can alternatively compute the Fundamental and/or Essential matrix by treating the sphere as six separate pinhole cameras, one camera for each side of the cube.

The image-set motion estimator 370 can determine motion between more than two cameras. The image-set motion estimator 370 can determine camera motion for a set of cameras. For example, the image-set motion estimator 370 can determine global camera motion and/or neighborhood camera motion.

Global camera motion is an estimate of camera motion that is globally consistent for at least those received images (i.e., the corresponding cameras of the images) that are included in the connectivity information. The rotation and translation estimator 368, using the bundle adjuster 372, can determine global motion as a non-linear optimization problem that solves for the positions and orientations of each camera through some variation of feature correspondences and bundle adjustment (i.e., via iterative minimization of reprojection error). Photogrammetric bundle adjustment (as described in the Visual Structure from Motion System (VisualSFM), the Open source Structure from Motion pipeline (OpenSFM), and the Open Multiple View Geometry library (OpenMVG)) and Match-Move algorithms (as described in Library for Multiview Reconstruction (libmv)) can be used to determine the global camera motion.

The image-set motion estimator 370 can first determine features between all the images to determine how the images are visually connected, and then perform the non-linear optimization for the respective (i.e., one for each camera) positions and orientations. If the solution converges (i.e., a solution is found), then the position of each image with respect to every other image is determined. Furthermore, global camera motion can provide a context for the inclusion and generation of 3D models through a typical photogrammetric pipeline. Such models can be used to back up a 3D panograph to provide depth occlusions for user interactions and other 3D content.

Determining global motion can add complexity and the non-linear optimization problem may not converge. That is, a global solution to camera poses (i.e., global camera motion) can be computationally intensive and/or prone to failure. At least for these reasons, determining relative motion may be preferable to global motion.

In some implementations, neighborhood camera motion can be determined. Neighborhood camera motion is motion of more than two but less than all cameras of the 3D panograph. For three or more cameras, using neighborhood motion, accurate distances can be calculated for the cameras of the neighborhood. Neighborhood camera motion can enable the placing of markup in 3D space and can be used for pacing of the navigation experience of the 3D panograph. Relative distances between the cameras of the neighborhood can be determined based on a scale between the cameras.

The neighborhoods can be determined based on the connectivity information. That is, the neighborhoods can be determined using the paths of the 3D panograph. For example, using neighborhoods of three cameras, neighborhood motion can be calculated for the cameras corresponding to the images 406, 408, and 410, for the cameras corresponding to the imagery of 402, 404, and 406, and for the cameras corresponding to the images 406, 408, and 410 of FIG. 4. For example, to determine a possible neighborhood for a viewpoint, the system 300 can determine a next viewpoint and a previous viewpoint along a path from the viewpoint. The system 300 can determine all or less than all possible neighborhoods for a viewpoint.

In some implementations of the system 300, camera motion (relative, global, or neighborhood) is not calculated. In such an implementation, an interpolation can be created using, for example, techniques described by Shanat Kolhatkar and Robert Laganière. 2010. Real-Time Virtual Viewpoint Generation on the GPU for Scene Navigation. In *Proceedings of the* 2010 *Canadian Conference on Computer and Robot Vision* (CRV '10). IEEE Computer Society, Washington, D.C., USA, 55-62. However, without having camera motion, potential correspondences between images may not be properly vetted (i.e., validated).

The system 300 can use the sparse correspondences, which are generated as described above. However, in some implementations, the system 300 can also include the dense feature finder module 340, which can use the camera motion to determine dense features. Dense correspondences are per-pixel correspondences between pairs of images. That is, dense correspondences can describe how pixels in one image correspond to pixels in another image. The dense feature finder module 340 can include a two-image stereo disparity module 342, a multiple view stereo disparity module 344, a hierarchical deformable dense feature matcher 346, and an optical flow displacement analyzer 348.

In the case of relative camera motion, the two-image stereo disparity module 342 can generate dense correspondences using, for example, a two image stereo rectification and disparity computation technique (such as one provided by the OpenCV, which is referred to above).

As accurate correspondences can be essential to the quality of interpolation, the dense feature finder module 340 can validate the correspondences. The system 300 can also validate sparse correspondences as described herein. The validation procedure can be largely the same for both pinhole and spherical images. As described above, the computed camera motion provides the Fundamental and/or Essential matrix between two cameras. The Fundamental and/or Essential matrix can be used to remove dense correspondence outliers. Correspondence outliers can be outliers that don't fall on epipolar lines (for pinhole cameras) and great circles (for spherical cameras).

Moving toward a place in an image, such as the epipole (for example, in FIG. 5, moving along the baseline 504 from the epipole point 508B towards the epipole point 508A) defines the center of expansion because features on the periphery appear to move away (e.g., disappear from view) from the epipole as the epipole is approached. Moving away from the epipole defines a center of contraction because features on the periphery become visible. The center of expansion and contraction can be used to cull out correspondences. For example, matched correspondences that fall on epipolar lines (great circles) but don't move along the epipolar lines (great circles) in accordance with the known motion direction can be discarded (i.e., culled). Such a constraint can be used to enforce that features move as expected with respect to the center of expansion or contraction of the image. In cases where the direction of camera motion is known, correspondences can be expected to move toward or away from the center of expansion/contraction. A correspondence that does not move as expected (e.g., the correspondence instead moves in the opposite direction), it can be can discarded.

In the case of pinhole cameras, matches (i.e., dense or sparse correspondences) that have large relative space displacement compared to typical feature displacements can also be culled.

In the case of spherical cameras, a correspondence (dense or sparse) can be culled based on the angular displacement of the correspondence. The angular correspondence can be a measure of the degree to which an angular difference deviates from the main distribution of the angular differences of the RANSAC consensus set (i.e., the inlier correspondences of the sparse features). An angular correspondence can be calculated by first transforming a to-be tested correspondence from a second image to a first image and then computing an angle Θ between the two correspondences, namely the to-be tested correspondence and the main distribution angle. A correspondence score can be calculated using formula (3):

$$\epsilon = \frac{|\theta - \mu_s|}{\sigma_s} \quad (3)$$

In formula (3), $\mu_s$ is the mean and $\sigma_s$ is the standard deviation of the angles between correspondences for the RANSAC consensus set. The dense correspondence is not culled (i.e., retained as a valid correspondence) when the correspondence score is below a threshold value. For example, the threshold value can be 0.95.

For sets of cameras (e.g., when global or neighborhood motion is determined), the multiple view stereo disparity module 344 can be used to find dense point correspondences in each image using any technique that can generate dense point correspondences. For example, the multiple view stereo disparity module 344 can be, or can implement techniques described in or provided by, the open multi-view reconstruction library (available at https://github.com/cdcseacave/openMVS) and/or the CMPMVS multi-view reconstruction software (http://ptak.felk.cvut.cz/sfmservice/websfm.pl?menu=cmpmvs).

In some implementations, the dense feature finder module 340 can include a hierarchical deformable dense feature matcher 346 that can detect and be tolerant to some motion (e.g., swaying tree branches, cloud movement) and non-rigid deformation (e.g., water waves) of objects between adjacent images. The hierarchical deformable dense feature matcher 346 can implement techniques described in J. Revaud, P. Weinzaepfel, Z. Harchaoui and C. Schmid, "DeepMatching: Hierarchical Deformable Dense Matching," IJCV, 2016. The techniques of the hierarchical deformable dense feature matcher 346 can be adapted to be tolerant of repeating textures and/or can be generalized to a be scale and rotation invariant.

In some implementations, the dense feature finder module 340 can include an optical flow displacement analyzer 348 that can detect large displacements between images. The optical flow displacement analyzer 348 can implement techniques described in J. Revaud, P. Weinzaepfel, Z. Harchaoui and C. Schmid, "DeepFlow: Large displacement optical flow with deep matching," Proc. ICCV'13, December, 2013.

A system 300 that includes the hierarchical deformable dense feature matcher 346 and/or optical flow displacement analyzer 348 can provide tolerance to motion and deformation. Tolerance to motion and/or deformation in the 3D panograph provides a navigation experience that can place the 3D panograph between 3D Models and video.

The morph generator module 320 can include a dense feature sub-sampler module 322, an orientation finder module 324, a feature triangulation module 326, and an integrity checker module 328.

In an implementation of the system 300 that determines dense features, the dense feature sub-sampler module 322 can sub-sample the dense features in order to generate a sparser morph mesh. A sparser morph mesh is a morph mesh that contains significantly fewer vertices than the number dense correspondences. A sparser morph mesh can improve efficiency and display quality of the 3D panograph. Some implementations of the system 300 may not include the dense feature sub-sampler module 322. The dense feature sub-sampler module 322 can identify regions of two images that change in similar ways in order to eliminate dense correspondences. For example, and referring to FIG. 6B (which is an example of a morph mesh 601), the scene of FIG. 6B includes a picture 610 with a frame having corners 602, 604, 606, and 608. The morph mesh 601 of the picture 610 includes many triangles. The dense feature sub-sampler module 322 can determine that the corners 602-608 move in similar ways from a first image to a second image. As such, the dense feature sub-sampler module 322 can reduce the number of triangles representing the picture 610 to a relatively small number of triangles (e.g., 2 triangles).

The feature triangulation module 326 determines the triangles, which connect the features of a first image. The triangles and features of the first image are to be interpolated (i.e., morphed into) the features and triangles of a second image thereby simulating a video-like experience from the first image to the second image. Unlike a typical Structure-From-Motion pipeline, which projects correspondences into a three-dimensional space in order to triangulate, the feature triangulation module 326 triangulates in the plane of the image for which triangulation is being performed. That is, triangulation is performed in the image plane. By avoiding computation of a 3D point from each correspondence and converting the 3D points into a mesh in 3D space, triangulation in the image plane produces, at least for the purposes of view interpolation, better quality (i.e., less erroneous) triangulation. The screen space (i.e., image plane) morph mesh can produce an improved interpolation experience as compared to a mesh generated via other techniques, such as a morph generated using a 3D Structure from Motion (SFM) pipeline. Other triangulation techniques may project correspondences into 3D space and may perform a multiple-view stereo technique to generate dense correspondences resulting in erroneous correspondences with less than optimal quality 3D morph meshes for the purposes of view interpolation. Using such other techniques, errors in 2D correspondences, even small errors, can create much larger errors when triangulated into 3D.

In the case of pinhole cameras, a pinhole triangulation module 330 of the feature triangulation module 326 can perform the triangulation via a Delaunay triangulation. For the points of the correspondences in one image, a Delaunay triangulation is a triangulation such that no point of the points of correspondences is inside a circumcircle of any triangle in the triangulation. In the case of a spherical camera, a spherical triangulation module 332 of the feature triangulation module 326 can perform the triangulation via a convex hull triangulation, such as described in Q. Zhao, L. Wan, W. Feng, J. Zhang, T.-T. Wong, "Cube2Video: Navigate between cubic panoramas in real-time," *IEEE Transactions on Multimedia Vol*, vol. 15, no. 8, pp. 1745-1754, 2013. Other triangulation techniques can be available in, or performed by, the feature triangulation module 326.

Figure 6B:
FIG. 6B is an example of a morph mesh according to implementations of this disclosure.

FIG. 6B is an example of a morph mesh 601 according to implementations of this disclosure. The morph mesh 601 illustrates the result of a Delaunay triangulation. The features (i.e., the vertices of the triangles) of the morph mesh 601 illustrate determining features via SURF.

The orientation finder module 324 can use the camera motion (e.g., the rotation and translation between cameras), determined by the camera motion estimator module 360, to determine, for the case of spherical cameras, the spherical image plane point that represents the location of the camera (e.g., a second image) being morphed or interpolated to (e.g., from a first image). The point can be the epipolar point defined by the two cameras. As shown in FIG. 5, line 524 (the line labeled $t_{12}$), which intersects with the spherical images, includes the epipolar points (i.e., points 520 and 522) on the two spherical image planes. The line 524 can be referred to as the baseline of the two spherical cameras. Leveraging the fact that humans tend to look in the direction that they are moving, the epipolar points and baseline can be used during user navigation of a 3D panograph to orient a virtual camera along the baseline 524 to enable movement along the center of expansion or contraction of the respective spherical images. As such, a virtual camera can be biased along the direction of motion for a natural navigation experience.

The morph generator module 320 determines an interpolation between a first morph mesh and a second morph mesh. Depending on the connectivity information, the morph mesh takes one set of 2D or 3D points and maps them to another set of positions over some time period. In a typical use of a morph mesh, the morph mesh is used to describe continuous, one-to-one motion. However, according to implementations of this disclosure, a morph mesh can be used to describe how objects move in 3D space between two viewpoints such that the movement is generally not continuous and/or not one-to-one. For example, the morph mesh can be used to describe motion of a scene wherein some parts of the scene may be exposed or hidden due to parallax. That is, complicated movement that may not be continuous or one-to-one can be approximated using the morph mesh with a simpler continuous and one-to-one interpolation function.

FIGS. 7A-7B illustrate areas of a scene 700 without correspondences according to implementations of this disclosure. FIG. 7A may be a first image taken by a first camera (at a camera position). FIG. 7B illustrates the same scene where the image is taken 2-3 feet from the image of FIG. 7A. Some of the features of an area 702 and an area 704 of FIG. 7B do not have correspondences in FIG. 7A because these areas are hidden in FIG. 7A.

Creating a morph mesh using the 2D correspondences (determined as described above) to describe an interpolation between a first image (e.g., FIG. 7A) and a second image (e.g., FIG. 7B), an interpolation with acceptable and realistic fidelity can be provided. This is because of the nature of correspondences: Correspondences only apply to features in both (or multiple) images simultaneously. As such, parts exposed or hidden by movement and parallax in one image will not have correspondences in a second image. Thus the morph mesh, when morphed from a start position (i.e., the first image) to an end position (i.e., the second image), is not likely to overlap itself in a noticeable way (i.e., to a user navigating the generating 3D panograph). Areas that are hidden or shown from one viewpoint to the next can be stretched or compressed as the mesh morphs.

The integrity checker module 328 can ensure consistency of the morph mesh. The integrity checker module 328 can cull morph mesh vertices based on topological consistency. For example, the integrity checker module 328 can validate a morph to ensure that the morph mesh, as it is interpolated, does not overlap itself. In an implementation, the integrity checker module 328 can iterate through some of all of the points (i.e., vertices or features) in a mesh. The points can be iterated in any order.

In one example, precedence can be given to features in the foreground of an image where the background and foreground compete. For example, the background and foreground may compete in an image that includes a large window with a large grid of muntin. Such an image illustrates a clear foreground (i.e., the muntin) and a clear background (the scene out the window). The muntin and the background can move out of synch with each other such that any morph mesh (i.e., an interpolation from a first image to a second image) may cross itself. For such cases concentrating on the foreground and eliminating the background (or vice versa) can reduce artifacts. As such, processing of the points can be done from farthest to nearest. A triangulated depth estimate, as described by R. Hartley and A. Zisserman, "Multiple view Geometry in computer vision," Cambridge University, Cambridge, $2^{nd}$ edition, 2003, can be used to guide the order of processing of the points. The triangulated depth estimate, for example, can be used to give precedence to the foreground points by processing the background points first.

Figure 8:
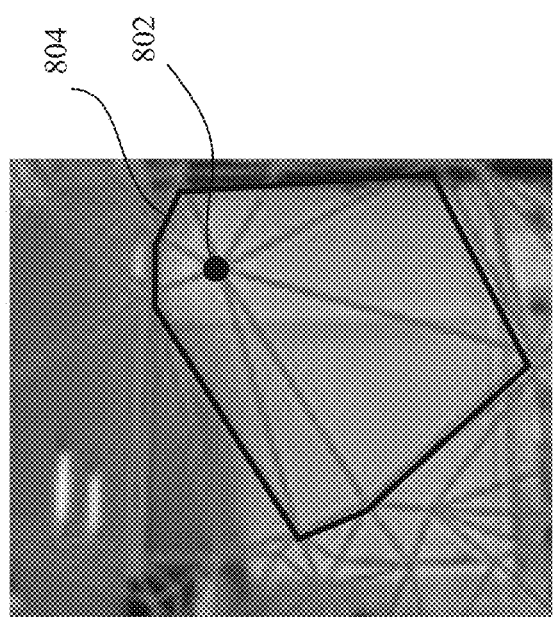
FIG. 8 is an example of a convex hull according to implementations of this disclosure.

Given a first and a second connected images, for at least some of the points of the morph mesh of the first image, a convex hull in the first image is computed. The convex hull is then transformed into the correspondences in the second image. FIG. 8 is an example 800 of a convex hull according to implementations of this disclosure. FIG. 8 illustrates a point 802 and its convex hull 804. If the transformed point of the point 802 escapes its transformed convex hull, then the point is culled (e.g., removed/excluded) from the correspondences. A point escapes its convex hull if it does not lie inside the transformed (i.e., interpolated convex hull).

In an iterative fashion, when a correspondence is culled, the feature triangulation module 326 can generate a new triangulation that can be re-validated by the integrity checker module 328. An overlap-free mesh can result in a few iterations (e.g., 3 to 4 iterations). This iterative process can eliminate additional bad correspondences that were not removed through previous checks and/or can remove background features that cross behind foreground features.

Figure 9:
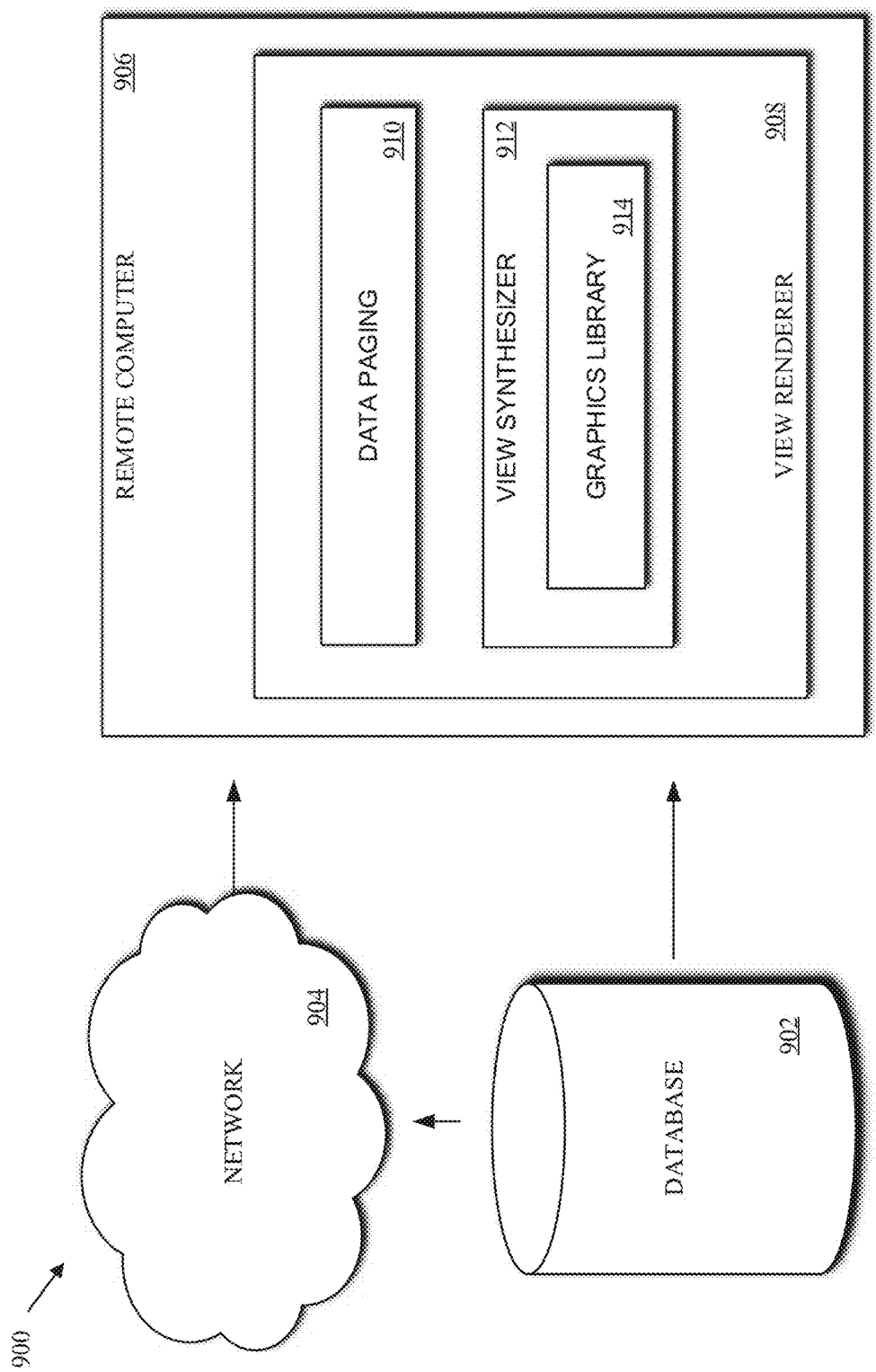
FIG. 9 is an example of a system for displaying a 3D panograph according to implementations of this disclosure.

FIG. 9 is an example of a system 900 for displaying a 3D panograph according to implementations of this disclosure. The system 900 can include a database 902, a network 904, and a remote computer 906. The system 900 can be used by an operator (e.g., a human user) to navigate a 3D panograph, such as a 3D panograph generated by the system 300 as described above. By navigating the 3D panograph, the operator can move from a first viewpoint (i.e., a first image) in the panograph to another viewpoint (i.e., a second image)

that is connected to the first viewpoint via the connectivity information. At a viewpoint, the operator can, depending on the image type at the viewpoint, look around. The system 900 provides a continuous view (i.e., video-like) experience between the first viewpoint and the second viewpoints by interpolating the images using the morph mesh. For example, in response to receiving a command from the user to navigate from a first viewpoint to a second viewpoint, the system 900 can display, such as on the display 218 of FIG. 2, successive interpolations of the first and/or the second images using the morph mesh.

The database 902 can be any data store where one or more 3D panographs are stored. Examples of the database 902 include a relational database, a portable memory device, and an application that, responsive to a request for a 3D panograph can provide the 3D panograph and/or parts of the 3D panograph to the requester. The network 904 can be any means for providing the 3D panograph to a device, such as the remote computer 906, where it will be rendered and interacted with. For example, the network 904 can be a wireless network, a wired network, a bus (such as the bus 212 of FIG. 2).

The remote computer 906 can be any device that is capable of rendering the 3D panograph. The remote computer 906 can be the computing device 200 of FIG. 2. The remote computer 906 can be the computing device 200 with additional specialized equipment for interacting with a virtual space (such as a 3D panograph). The remote computer 906 can be, or can include, a virtual reality headset or the like. The remote computer 906 can include a view renderer 908, which can include a data paging module 910 and a view synthesizer 912.

The view renderer 908 receives at least some of the images and an associated interpolation morph mesh for a 3D panograph. The images and associated morph meshes can be streamed onto one or more graphical processing units (GPUs) of the view synthesizer 912 for interactive playback. The GPUs can implement graphics libraries 914. The graphics libraries 914 can be or can include graphics libraries such as the Open Graphics Library (OpenGL) and/or the Web Graphics Library (WebGL) or the like. Interactive playback means navigating the 3D panograph from one viewpoint to another such that the navigation can be provided by successive interpolations along the path from the one viewpoint to the other viewpoint. The interpolations can use the morph mesh associated with the one viewpoint and the other viewpoint. In the system 900, the interpolations can rendered at high frame rates due to the simplicity and compactness of the representation (i.e., the morph meshes).

To enable fast playback, a neighborhood of the structure can be cached in, for example, the data paging module 910 and/or graphics memory. For example, in a case where a user is at a viewpoint, information for at least some of the connected viewpoints can be cached (e.g., downloaded in the background and/or loaded into memory). Additional sections of the structure of the 3D panograph can be paged in as needed depending on the graph location and view parameters in a shifting region of interest that draws from a database as the user navigates the structure. That is, the view renderer 908 can anticipate, based the user's current viewpoint, one or more next viewpoints and pre-load the information for such next viewpoints. The data paging module 910 can implement a level of detail (LOD) scheme for efficiently streaming resources (e.g., images and/or morph meshes) based on a current view direction (i.e., the direction of navigation, by the user, through the viewpoints of the 3D panograph) and virtual camera parameters. Caching, or pre-fetching, can anticipate a user's next navigation so that the system, when the user performs a navigation to another viewpoint, can be responsive to the user navigation.

The view synthesizer 912 guides the morphing operation (i.e., interpolation) from the starting to the ending camera (i.e., from a first viewpoint to a second viewpoint) in proportion to the distance between the two camera positions. As discussed above, the morph mesh encodes the motion in the image plane. As such, world (i.e., 3D) position and rotation of the camera need not be interpolated or used in interpolation calculations. However, in a situation where global camera or neighborhood camera positions are determined and encoded in the 3D panograph, rotation and translation interpolation can be performed by the view renderer 908 in order to orient the camera so as to be synchronized with other 3D content thereby providing a more realistic experience to the user.

Given a first image (corresponding to a first viewpoint) and a second image (corresponding to a second viewpoint), the view renderer 908 can perform a single morph all the way from the first viewpoint to the second viewpoint. Alternatively, the view renderer 908 can perform two simultaneous morphing operations: a first morph operation from the first image to the second image and a second morph operation from second image to the first image. The two resulting meshes can be blended. In one example, the two meshes can be evenly blended with alpha blending. Combining the meshes in this way can lead to a smoother navigation experience and fewer rendering artifacts as compared to, for example, performing a single morph all the way from the first viewpoint to the second viewpoint. In another implementation, blending using multi-texturing can be performed. Blending with multi-texturing can be more efficient because a second mesh (i.e., from the second viewpoint to the first) is not necessary. Blending using multi-texturing can be used to hide stretching and/or compressing in the morph mesh by blending in the imagery from the second viewpoint.

Pacing (i.e., the velocity of display of the interpolations/morphing from a first viewpoint to a second viewpoint) can depend on the camera motion. In the case of global camera motion, pacing the view interpolation can be based on the distance between first and the second camera and on a velocity. The velocity can be selected by the user and/or can be a default velocity set for the 3D panograph. In the case of relative camera motion, and in order to get relatively similar pacing between viewpoints, it is preferable that the distance between image capture locations be fixed (e.g., the images are taken at equal distances from each other). As such, interpolating in a normalized range (e.g., from zero to one) at a given velocity can be proportional to a particular physical traversal speed.

Some techniques may perform triangulation in 3D space. However, the techniques described herein perform triangulation in the image plane. Triangulation in the image plane is a simpler solution and provides many advantages including elimination of (or at least reduction in) blurring artifacts due to 3D triangulation errors and higher synthesis performance during real-time playback. Also, triangulation in the image plane as described herein provides better performance than solutions that employ per pixel GPU morphing approaches.

Some other systems may compute the coordinates of an interpolated sphere mesh triangle-by-triangle using a simple correspondence triangulation of one correspondence pairs x, x' of the vertex of the triangle under consideration in order to get a 3D world point X. The world point X is then reprojected to the estimated interpolated sphere. The interpolated sphere is given by a position C" and rotation R".

$$C''=tC'+(1-t)C \quad (4)$$

In equation (4), t is an interpolation parameter that is between 0 and 1 and C, C' are the positions of the first and second cameras. For the interpolated spherical camera, the projection equation is given by equation (5):

$$x'' = \frac{R''(X-C'')}{\|R''(X-C'''')\|} \quad (5)$$

Equation (5) is the normalization of the world point with respect to interpolated camera coordinate system and R" is the camera rotation matrix. Accordingly, in such other systems, the image plane for the spherical camera is the unit sphere.

In the systems, techniques, and methods according to implementations of this disclosure, a point x in a first image moves in the image plane along a linear path through 3D space toward point x', which corresponds to the point x, guided by the interpolation variable t. Approximating the path that the point x will take toward point x' as a line in space might seem liable to produce less plausible interpolations compared with other techniques that reproject from 3D. This may also seem true considering the spherical case where the image plane is also a sphere. However, that is not so.

For pinhole cameras, interpolating along a line in image space produces plausible interpolations because features move along epipolar lines between camera views.

On a sphere, a straight line interpolation can lead to implausible motion especially when the image plane displacement of corresponding features is large. However, implementations according to this disclosure use a modified morph mesh for spherical cameras that constrains features to move along epipolar great circles.

Referring back to FIG. 5B, for the spherical epipolar geometry, for point 516 $z_{1p}$ in the first image 512, the equation $(z_{1p}{}^T E_{12})z=0$ draws a great circle in the second image 514. The equation can be applied in the vertex shaders of GPU graphics systems. By intersecting a linearly interpolated point x" with a ray from the center of the sphere, the resulting point lies on the correct epipolar great circle.

Figure 10:
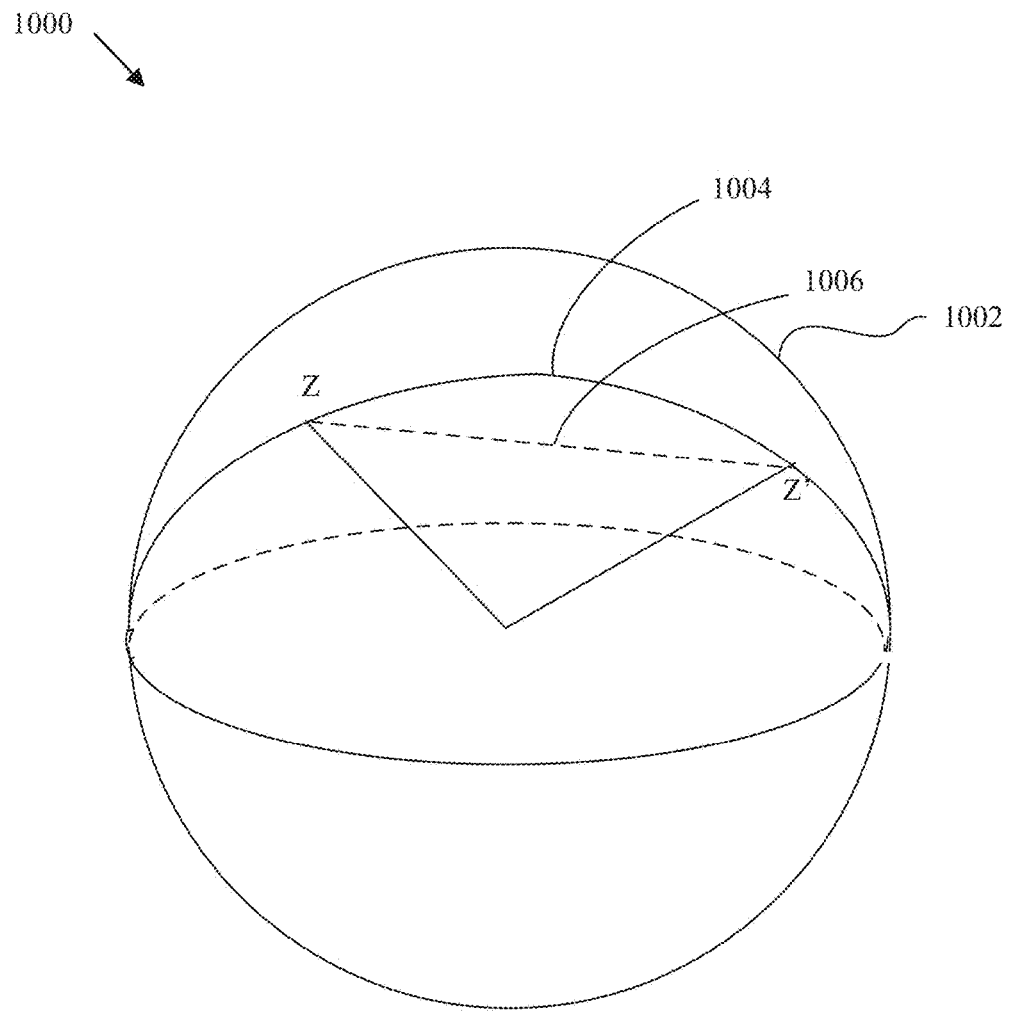
FIG. 10 is an example of a morph path along a great circle according to implementations of this disclosure.

FIG. 10 is an example 1000 of a morph path along a great circle according to implementations of this disclosure. FIG. 10 illustrates a morph path of a single feature correspondence in a spherical image. Other systems may linearly morph an image point z (i.e., a feature) to point z' along a dotted line 1006. However, in implementations in accordance with this disclosure, the path traveled by the point z is along the epipolar great circle indicated by line 1004 along the top hemisphere of the spherical image 1002.

Figure 11:
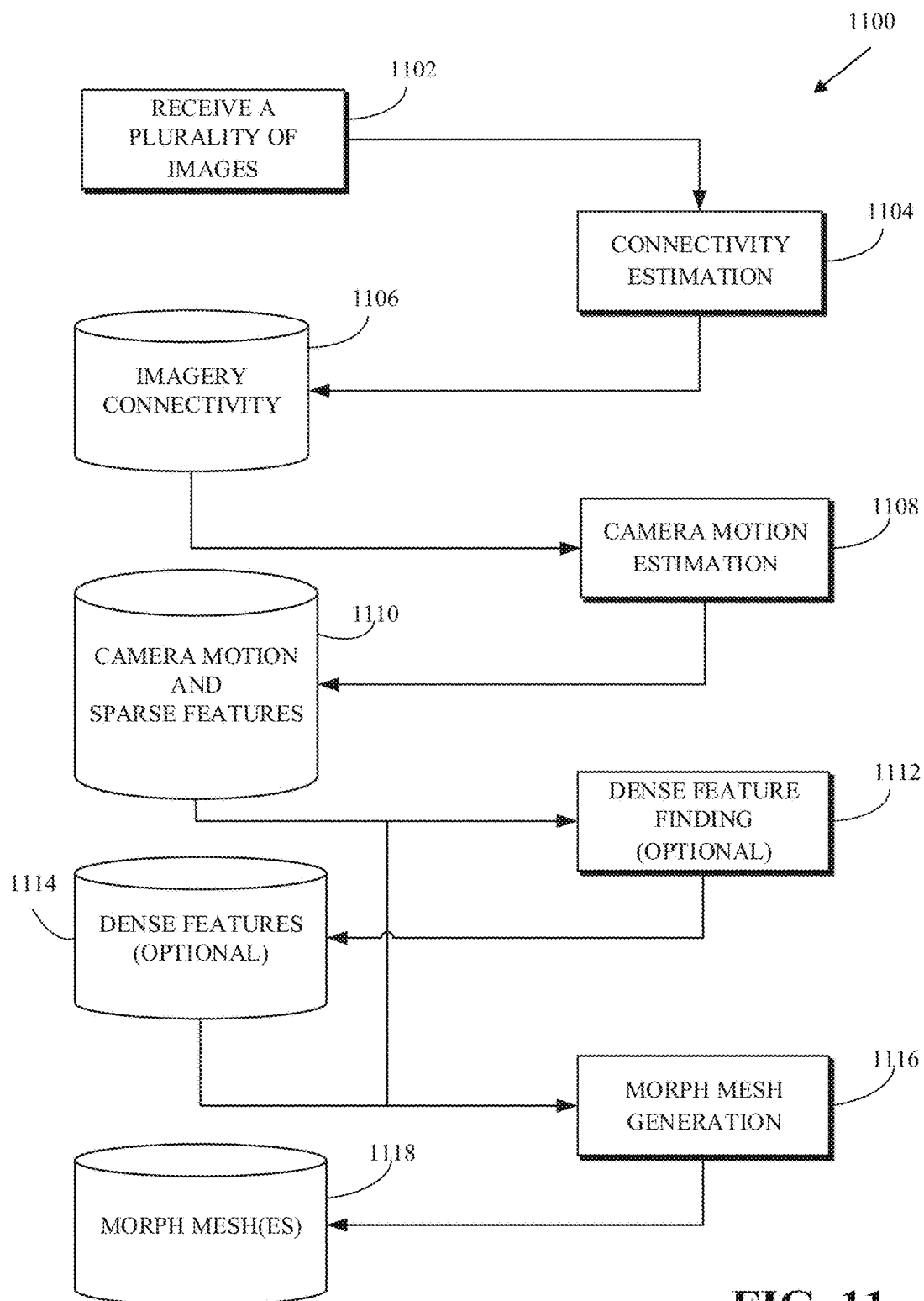
FIG. 11 is an example of a process for creating a 3D panograph of a 3D space according to an implementation of this disclosure.

FIG. 11 is an example of a process 1100 for creating a 3D panograph of a 3D space according to an implementation of this disclosure. At 1102, the process 1100 receives a plurality of images of a 3D space. At 1104, the process 1100 determines connectivity information 1106 between at least two images of the plurality of images. The process 1100 can determine the connectivity information as described above with respect to the connectivity estimator 302 of FIG. 3. The process 1100 can use the imagery connectivity information 1106, at 1108, to estimate camera motion. The camera motion can be determined between pairs of connected images or globally. The process 1100 can estimate camera motion as described above with respect to the camera motion estimator 360 of FIG. 3. The camera motion estimation 1108 results in camera and sparse features 1110. In some implementations, estimation of camera motion is optional. As such, the process 1100 may not include the camera motion estimation 1108.

Some examples of the process 1100 can generate dense features via dense feature finding 1112. Dense feature finding 1112 can use the camera and sparse features 1110 to generate dense features 1114. The process 1100 can find dense features as described above with respect to the dense feature finder 340 of FIG. 3.

At 1116, the process 1100 generates morph meshes 1118. The process 1110 can generate the morph meshes 1118 as described above with respect to the morph generator 320 of FIG. 3. The process 1100 generates the morph meshes 1118, via 1116, using the camera motion and sparse features 1110. In implementations that include dense feature finding 1112, the process 1100, via 1116, can additionally, or alternatively, use the dense features 1114 to generate the morph meshes.

Figure 12:
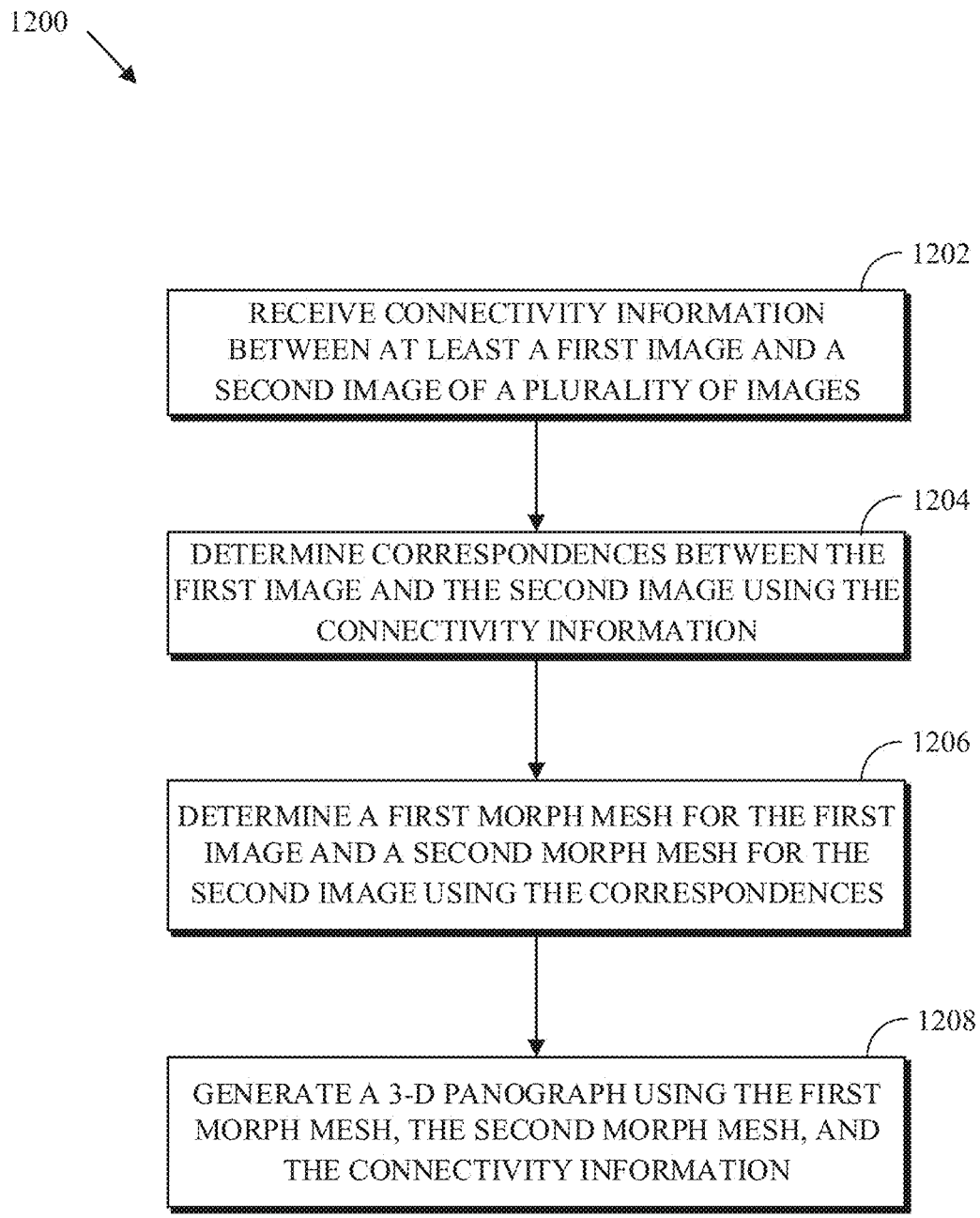
FIG. 12 is a flowchart diagram of a process for generating a 3D panograph of a 3D space according to an implementation of this disclosure.

FIG. 12 is a flowchart diagram of a process 1200 for generating a 3D panograph of a 3D space according to an implementation of this disclosure. The 3D panograph generated based on the imagery (i.e., images) of the 3D space. The process 1200 determines, using the connectivity information between the images, correspondences between the images. The process 1200 then creates one or more morph meshes using the correspondences. Navigating the 3D panograph then includes interpolating the images according to the morph meshes. The process 1200 can be implemented by a system, such as the system 300 of FIG. 3.

The process 1200 can be implemented, for example, as a software program that can be executed by computing devices such as the computing device 200 of FIG. 2. The software program can include machine-readable instructions that can be stored in a memory such as the memory 204 or the secondary storage 214, and that can be executed by a processor, such as CPU 202, to cause the computing device to perform the process 1200.

The process 1200 can be implemented using specialized hardware or firmware. Some computing devices can have multiple memories, multiple processors, or both. The steps or operations of the process 1200 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 1200 can receive a plurality of images of the 3D space. The images can include images from pinhole cameras or spherical cameras. The images can include cube maps For example, the cube maps can be images from box cameras. The images can also include images from cylindrical, orthographic, or fish-eye cameras. Images from other camera types are also possible.

At 1202, the process 1200 receives connectivity information. The process 1200 can receive connectivity information as described with respect to the connectivity estimator module 302 of FIG. 3. As described with respect to the connectivity estimator module 302, the process 1200 can receive connectivity information between image pairs, can determine the connectivity information, or a combination thereof. The connectivity information includes connectivity information between at least a first image and a second image of the plurality of images.

At 1204, the process 1200 determines correspondences between images using the connectivity information. For example, the process 1200 can determine correspondences between the first image and the second image. The process 1200 can determine correspondences as described with respect to the feature finder 310 and the feature matcher 308 of FIG. 3. In some implementations, the process 1200 can determine correspondences using the dense feature finder 340 as described above with respect to FIG. 3. The process 1200 determines correspondences between the first image and the second image.

At 1206, the process 1200 determines a first morph mesh for the first image and a second morph mesh for the second image using the correspondences. The process 1200 can provide the first morph mesh and the second morph mesh as described with respect to the morph generator module 320 of FIG. 3.

At 1208, the process 1200 generates the 3D panograph. The 3D panograph includes the first morph mesh, the second morph mesh, and the connectivity information. Using a displaying system, such as the system 900, and/or the remote computer 906 of FIG. 9, a user can virtually navigate the 3D space using the 3D panograph. The 3D panograph can be navigated using the first morph mesh, the second morph, and the connectivity information. In some implementations, the second morph mesh is not determined. One morph mesh is determined for the first image and the second image using the correspondences.

The 3D panograph is navigable, from a first image to a second image, by interpolating between the first image using the first morph mesh and the second image using the second morph mesh. The first image and the second image can be viewpoints in a navigation of the 3D panograph. If the second image is from a spherical camera, a feature of the first morph mesh can be interpolated, during the navigation, along an epipolar great circle of the spherical camera.

In an implementation, determining correspondences at 1204 can include triangulating in the image plane of a camera. For example, in the case where the camera of an image is a pinhole camera, triangulating in the image plane of the camera can use a Delaunay triangulation. In the case where the camera is a spherical camera, triangulating in the image plane of the camera can use convex hull triangulation.

In an example, the process 1200 can also include excluding from the first morph mesh overlapping correspondences. Overlapping correspondences can be excluded by firstly, determining a convex hull for a first feature in a morph mesh, where the first feature is a feature of the first image and is connected, using the connectivity information, to a second feature in a second image, secondly, morphing the convex hull from the first image to the second image, resulting in a transformed convex hull, and thirdly, responsive to determining that the second feature is outside the transformed convex hull, removing the first feature from the first morph mesh.

In an implementation, receiving connectivity information at 1202 includes determining first features in the first image and second features in the second image, determining correspondences between the first features and the second features resulting a matching score, and determining that the first image and the second image are connected in response to the matching score exceeding a threshold. For example, the threshold can be the minimum number of features that must match between the first image and the second image in order to determine that the first image and the second image are connected. In another example, receiving connectivity information at 1202 can, additionally or alternatively, include determining, for a first camera associated with the first image and a second camera associated with the second image, respective camera motion associated with the first camera and the second camera, and determining the connectivity information using the camera motion. The camera motion can be one of relative camera motion between the first camera and the second camera, a global camera motion of the cameras of the images of the 3D space.

In an implementation, wherein the correspondences include a feature match between a first feature of the first image and a second feature of the second image, determining correspondences at 1204 includes, in response to the first camera and the second camera being pinhole cameras, excluding, from the correspondences, the feature match in response to determining that the first feature and the second feature do not move along epipolar lines in accordance with the camera motion, and excluding, from the correspondences, the feature match in response to determining that the first feature and the second feature are disproportionally displaced. Determining correspondences at 1204 also includes in response to the first camera and the second camera being spherical cameras, excluding, from the correspondences, the feature match in response to determining that an angular displacement of the first feature and the second feature exceeds a threshold, and excluding, from the correspondences, the feature match in response to determining that the first feature and the second feature do not move along epipolar great circles in accordance with the camera motion.

In another example, determining correspondences at 1204 includes determining dense correspondences and sub-sampling the dense correspondences to generate sparse correspondences.

In other systems, once the interpolated mesh points are computed through reprojection, a triangle-to-triangle homography transformation is computed for each triangle pair. The homography is computed based on the three correspondences at the vertices of each triangle and two virtual camera matrices defined with origin at respective spherical camera centers and looking perpendicular to each triangle. The virtual cameras have image planes coinciding with the triangle planes. The resulting interpolated cubic panorama is generated using backward warping. In a pixel by pixel operation on the interpolated view triangle, the corresponding pixel is found in each of the two original images and the results are blended. These operations may be parallelized by a GPU implementation that leverages the computer unified device architecture (CUDA). The resulting cube map is then used on the GPU for display.

Contrastingly, implementations according to this disclosure only perform, for each vertex of a morph mesh, an intersection of the morph mesh and a spherical image plane. The intersection operations can be performed in parallel in the vertex shaders of a GPU. In an interpolated image, standard GPU texture mapping and alpha blending operations can resample and blend pixels for mesh triangles. No conversion to a cube map for display is performed. The morph mesh itself can be used directly for display.

Additionally, in some implementations, the morph operation can be decoupled from camera motion since the morph occurs only in the image plane. If camera motion is available, the morph can be oriented to take into account the relative motion of the cameras. Otherwise, and to provide a fallback in cases where camera motion is not available, the morph itself can effectively encode the rotation between the cameras. Camera motion may not be available in cases where camera motion computation fails.

The techniques, methods, and systems described herein for generating 3D panographs work particularly convincingly, especially for forward motion where objects in the scene are not too close to the start and end camera. Open indoor spaces and outdoors are especially good. Also, interpolation errors and visual artifacts tend to get hidden by the blur of camera motion as interpolation proceeds. People are used to objects in the periphery moving by quickly and with less fidelity since they tend to look roughly in the direction they are walking. Thus the center of expansion or contraction tends to have the focus of the fovea and the periphery is afforded lower acuity peripheral vision. Since the periphery of the interpolation (assuming motion while facing forward along the baseline of the two cameras) tends to have the most visual artifacts this works to the advantage of this techniques disclosed herein.

Implementations of the system 300 can include modules or methods for alleviating issues related to close objects. For example, perpendicular movement with a close object may require special handling. For example, consider a person is standing close to a telephone pole and is viewing an object in the background on the left side of the pole. If the person steps three or four feet perpendicularly, the object becomes visible from the right side of the pole. In this case a single morph mesh will cross itself in a dramatic way. However, when navigating an environment along imagery paths, the predominant view direction is along the path of motion and results are typically convincing. One technique to address any such areas can be to reduce the imagery sampling distance. Additionally, or alternatively, combining correspondences from a neighborhood of images along a path can be another way to ameliorate problems with close objects.

Image-based 3D panographs provide a video-like experience for virtually navigation through a 3D space. Advantages of image-based 3D panographs are now provided by comparison to a video-based solution. In a video-based solution, the video can be expected to be spatially paced. This pacing can be accomplished during capture of the video by moving at a constant rate, which may not be practical. Pacing may be accomplished by a post processing of the video to determine the distance travelled per frame (i.e., from frame to frame). Post processing can include applying match-moving, photogrammetry, or optical flow techniques. An undesirable result is that playback speed of the video may have to correlate with the speed an end user desires to move through the environment during playback. Additionally, the video is expected to be playable forward and backward and at different rates in order to simulate moving through the environment at specific velocities (as desired by a user). Forward and backward play must be instantaneous so that a user can stop, go backward, turn around and go the opposite direction. As such, multiple videos may be required to make a multiply branching graph (i.e., a graph that can be branched in multiple directions to support different navigation paths). To provide a seamless branching experience during playback, a handoff from one video to another need be performed. As such, the use of video increases bandwidth unnecessarily. 3D panographs that use still images, as described herein, can provide equivalent quality to video and/or high quality HDR, but at lower bandwidth requirements. From a bandwidth perspective the 3D panograph is an efficient structure especially as compared to video of comparable imagery resolution. Also, and unlike video, the 3D panograph does not require the performance of CPU-intensive video decoding when streaming (e.g., over the internet).

To get a stable experience with video, gyroscopic stabilization may be required during capture or software stabilization may be required as a video post processing step. Contrastingly, the 3D panograph appears, to a user, as a stabilized video without any additional equipment or processing.

Another advantage of 3D panographs over video is that the experience is based on still imagery. This means that each imagery location can be of significantly higher quality than any particular video frame. For example it may be the result of combining multiple exposures taken at very high resolution at low ISO values and then combined into a single HDR image. This cannot be accomplished with video.

Some techniques that may provide real-time view morphing calculate the optical flow fields on the faces of a cubic panorama that has been extended along each face of the cube to account for the discontinuity of the cubic representation. View interpolation in such systems can be applied with a per-pixel view morph on the GPU. Such techniques may suffer from severe artifacts and/or break down with larger displacements between cameras. Contrastingly, implementations according to this disclosure provide higher performance because a morph mesh is per-vertex, rather than per-pixel. Additionally, using a morph mesh can significantly reduce the size of the interpolation data, which in turn reduces bandwidth usage during streaming. Also, since, as described above, the morph meshes are relatively sparse, compared to per-pixel representations, artifacts can be significantly reduced. The use of a morph mesh can be more tolerant to larger displacements between images due, in part, to the use of high quality sparse feature matches that have been validated against epipolar constraints, dominant motion, angular displacement between correspondences and the further culling of matches that violate mesh topology.

Other techniques may employ an angular error metric in the sphere domain in addition to epipolar constraints to cull unreliable correspondences. Convex hull triangulation is then applied to triangulate features on a unit sphere. Morphing is accomplished by computing a triangle-to-triangle homography between a pair of source and destination triangles and then synthesizing the interpolated triangle by backward warping. Additional compensation transformations are needed to smooth temporal shaking. In such techniques, computations per frame during playback interpolation require complex operations per triangle in order to compute homographies and may require multiple computation passes. In addition, per-pixel transforms are required during backward warping. Consequently, performance is substantially slower than playback according to implementations of this disclosure. Moreover, in these techniques, calculations depend upon 3D triangulated points, which subject the technique to 3D reconstruction errors and consequent blurring of the interpolation. Additional computation can be added to mitigate this to some extent. Contrastingly, implementations according to this disclosure do not employ, depend on, or use 3D triangulation; rather image plane interpolation is performed as described above.

Because imagery of a 3D panograph are captured close together and are feature based, a user, during playback, can perceive changes in material properties. For example, specular reflections, reflections in mirrors and far away scenes outside of windows can be perceived since they are captured in the 3D panograph.

Because visual cues (i.e., correspondences) are used for the interpolation, a 3D panograph of large, open and outdoor environments can provide good interpolation results whereas laser scanning systems cannot as effectivity handle such environments.

The implementations herein may be described in terms of functional block components and various processing steps. The disclosed processes and sequences may be performed alone or in any combination. Functional blocks may be realized by any number of hardware and/or software components that perform the specified functions. For example, the described implementations may employ various integrated circuit components (e.g., memory elements, processing elements, logic elements, look-up tables, and the like), which may carry out a variety of functions under the control of one or more microprocessors or other control devices. Similarly, where the elements of the described implementations are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the implementations of the disclosure could employ any number of conventional techniques for electronics configuration, signal processing and/or control, data processing and the like.

Aspects or portions of aspects of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

The use of "including" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for generating a 3D panograph of a 3D space, comprising:
    receiving connectivity information between at least a first image and a second image of a plurality of images;
    determining correspondences between the first image and the second image using the connectivity information;
    determining a first morph mesh for the first image and a second morph mesh for the second image using the correspondences;
    excluding from the first morph mesh overlapping correspondences by:
        determining a convex hull for a first feature in the first morph mesh, wherein the first feature is a feature of the first image and is connected, using the connectivity information, to a second feature in the second image;
        morphing the convex hull from the first image to the second image, resulting in a transformed convex hull; and responsive to determining that the second feature is outside the transformed convex hull, removing the first feature from the first morph mesh; and generating the 3D panograph comprising the first morph mesh, the second morph mesh, and the connectivity information, wherein the 3D panograph is navigable using the first morph mesh, the second morph mesh, and the connectivity information.

2. The method of claim 1, wherein the 3D panograph is navigable by interpolating between the first image using the first morph mesh and the second image using the second morph mesh, further wherein the first image and the second image constitute viewpoints in a navigation of the 3D panograph.

3. The method of claim 2, wherein the second image is from a spherical camera, further wherein a feature of the first morph mesh is interpolated, during the navigation, along an epipolar great circle of the spherical camera.

4. The method of claim 1, wherein the first image is from a first camera and wherein determining the correspondences using the connectivity information comprises: triangulating in an image plane of the first camera.

5. The method of claim 1, wherein receiving the connectivity information between at least the first image and the second image of the plurality of images comprises:
 determining first features in the first image and second features in the second image;
 determining correspondences between the first features and the second features resulting a matching score; and
 determining that the first image and the second image are connected in response to the matching score exceeding a threshold.

6. The method of claim 1, wherein receiving the connectivity information comprises:
 determining, for a first camera associated with the first image and a second camera associated with the second image, camera motion associated with the first camera and the second camera; and
 determining the connectivity information using the camera motion.

7. The method of claim 6, wherein the camera motion is any of a relative camera motion between the first camera and the second camera and a global camera motion of respective cameras of the plurality of images of the 3D space.

8. The method of claim 6, wherein the correspondences comprise a feature match between a first feature of the first image and a second feature of the second image, and wherein determining the correspondences using the connectivity information comprises:
 in response to the first camera and the second camera being spherical cameras,
 excluding, from the correspondences, the feature match in response to determining that an angular displacement of the first feature and the second feature exceeds a threshold, and
 excluding, from the correspondences, the feature match in response to determining that the first feature and the second feature do not move along epipolar great circles in accordance with the camera motion.

9. The method of claim 6, wherein the correspondences comprise a feature match between a first feature of the first image and a second feature of the second image, and wherein determining the correspondences using the connectivity information comprises:
 in response to the first camera and the second camera being pinhole cameras,
 excluding, from the correspondences, the feature match in response to determining that the first feature and the second feature do not move along epipolar lines in accordance with the camera motion, and
 excluding, from the correspondences, the feature match in response to determining that the first feature and the second feature are disproportionally displaced.

10. The method of claim 1, wherein determining the correspondences using the connectivity information comprises:
 determining dense correspondences; and
 sub-sampling the dense correspondences to generate sparse correspondences.

11. A system of generating a 3D panograph of a 3D space, comprising:
 a processor; and
 a memory coupled to the processor, the memory includes instructions executable by the processor to:
 receive connectivity information between at least a first image and a second image of a plurality of images;
 determine correspondences between the first image and the second image using the connectivity information;
 determine a morph mesh for the first image and the second image using the correspondences;
 exclude from the morph mesh overlapping correspondences by:
  determining a convex hull for a first feature in the morph mesh, wherein the first feature is a feature of the first image and is connected, using the connectivity information, to a second feature in the second image;
  morphing the convex hull from the first image to the second image, resulting in a transformed convex hull; and
  responsive to determining that the second feature is outside the transformed convex hull, removing the first feature from the morph mesh; and
 generate the 3D panograph, the 3D panograph comprising the morph mesh and the connectivity information.

12. The system of claim 11, wherein the 3D panograph is navigable by interpolating between the first image and the second image using the morph mesh, and further wherein the first image and the second image constitute viewpoints in a navigation of the 3D panograph and wherein the 3D panograph is navigable using the morph mesh and the connectivity information.

13. The system of claim 12, wherein the second image is from a spherical camera, and further wherein a feature of the morph mesh is interpolated, during the navigation, along an epipolar great circle of the spherical camera.

14. The system of claim 11, wherein the first image is from a first camera and wherein to determine the correspondences using the connectivity information further comprises to:
 in response to the first camera being a pinhole camera, triangulate in an image plane of the first camera; and
 in response to the first camera being a spherical camera, triangulate using convex hull triangulation.

15. The system of claim 11, wherein to receive the connectivity information between at least the first image and the second image of the plurality of images comprises to:
 determine, for a first camera associated with the first image and a second camera associated with the second image, camera motion associated with the first camera and the second camera; and determine the connectivity information using the camera motion.

16. The system of claim 15, wherein the correspondences comprise a feature match between a first feature of the first image and a second feature of the second image, and wherein to determine the correspondences using the connectivity information comprises to:
- on a condition that the first camera and the second camera are pinhole cameras, exclude, from the correspondences, the feature match in response to determining that the first feature and the second feature do not move along epipolar lines in accordance with the camera motion, and
- exclude, from the correspondences, the feature match in response to determining that the first feature and the second feature are disproportionally displaced; and
- on condition that the first camera and the second camera are spherical cameras, exclude, from the correspondences, the feature match in response to determining that an angular displacement of the first feature and the second feature exceeds a threshold, and
- exclude, from the correspondences, the feature match in response to determining that the first feature and the second feature do not move along epipolar great circles in accordance with the camera motion.

* * * * *